(12) United States Patent
Yue et al.

(10) Patent No.: US 11,012,601 B1
(45) Date of Patent: May 18, 2021

(54) DUAL CAMERA MODULE SYSTEMS

(71) Applicant: Amazon Technologies, Inc., Seattle, WA (US)

(72) Inventors: Shuai Yue, Mercer Island, WA (US); Matthew Christopher Smith, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/579,071

(22) Filed: Sep. 23, 2019

(51) Int. Cl.
| | |
|---|---|
| *H04N 5/225* | (2006.01) |
| *G03B 17/55* | (2021.01) |
| *H04N 5/247* | (2006.01) |
| *H04N 13/106* | (2018.01) |
| *G02B 30/34* | (2020.01) |

(52) U.S. Cl.
CPC ........... *H04N 5/2257* (2013.01); *G02B 30/34* (2020.01); *G03B 17/55* (2013.01); *H04N 5/247* (2013.01); *H04N 13/106* (2018.05)

(58) Field of Classification Search
CPC .... H04N 5/2257; H04N 5/247; H04N 13/106; G02B 30/34; G03B 17/55
See application file for complete search history.

(56) References Cited

U.S. PATENT DOCUMENTS

| | | | |
|---|---|---|---|
| 7,225,980 B2 | 6/2007 | Ku et al. | |
| 7,949,568 B2 | 5/2011 | Fano et al. | |
| 8,009,864 B2 | 8/2011 | Linaker et al. | |
| 8,175,925 B1 | 5/2012 | Rouaix | |
| 8,189,855 B2 | 5/2012 | Opalach et al. | |
| 8,423,431 B1 | 4/2013 | Rouaix et al. | |
| 8,630,924 B2 | 1/2014 | Groenevelt et al. | |
| 8,688,598 B1 | 4/2014 | Shakes et al. | |
| 8,896,671 B2 * | 11/2014 | Jayaram | H04N 5/2254 348/48 |
| 9,473,747 B2 | 10/2016 | Kobres et al. | |
| 10,530,973 B2 * | 1/2020 | DePaschoal | H04N 13/239 |
| 2003/0002712 A1 | 1/2003 | Steenburgh et al. | |
| 2004/0181467 A1 | 9/2004 | Raiyani et al. | |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Jason A Flohre
(74) *Attorney, Agent, or Firm* — Athorus, PLLC

(57) ABSTRACT

A dual camera module system includes a housing and a pair of camera modules (e.g., digital cameras) that are aligned with fields of view that overlap below the housing. The camera modules are mounted to a bench within the housing. The dual camera module system is configured for mounting above areas such as retail establishments or other materials handling facilities. The housing is formed from one or more sections of plastic or like materials, and includes inlets and outlets that enable air to flow past the camera modules and other components within the housing, and to maintain such components at a desired temperature. Images captured by the imaging devices of the camera module may be utilized for any purpose.

20 Claims, 30 Drawing Sheets

(56) References Cited

U.S. PATENT DOCUMENTS

| | | | |
|---|---|---|---|
| 2007/0014347 A1* | 1/2007 | Prechtl | H04N 5/23238 375/240.01 |
| 2007/0024743 A1* | 2/2007 | Hida | H04N 5/2252 348/373 |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2009/0121017 A1 | 5/2009 | Cato et al. | |
| 2009/0245573 A1 | 10/2009 | Saptharishi et al. | |
| 2011/0011936 A1 | 1/2011 | Morandi et al. | |
| 2012/0242837 A1* | 9/2012 | Sasagawa | H04N 5/2254 348/159 |
| 2012/0284132 A1 | 11/2012 | Kim et al. | |
| 2013/0076898 A1 | 3/2013 | Philippe et al. | |
| 2013/0253700 A1 | 9/2013 | Carson et al. | |
| 2014/0279294 A1 | 9/2014 | Field-Darragh et al. | |
| 2014/0362223 A1 | 12/2014 | LaCroix et al. | |
| 2015/0019391 A1 | 1/2015 | Kumar et al. | |
| 2015/0073907 A1 | 3/2015 | Purves et al. | |
| 2015/0162048 A1* | 6/2015 | Hirata | H04N 5/23299 386/337 |
| 2017/0041535 A1* | 2/2017 | Nguyen | H04N 5/247 |
| 2017/0178352 A1* | 6/2017 | Harmsen | H04N 13/271 |
| 2018/0130255 A1* | 5/2018 | Hazeghi | H04N 5/2252 |
| 2018/0332236 A1* | 11/2018 | Glaser | H04N 5/23241 |
| 2018/0356710 A1* | 12/2018 | Bingleman | H04N 5/2252 |
| 2019/0028054 A1* | 1/2019 | Karkheck | H02S 40/36 |
| 2019/0081587 A1* | 3/2019 | Mayfield | F24S 25/10 |
| 2019/0191083 A1* | 6/2019 | Gorloff | H04N 5/23238 |
| 2020/0201144 A1 | 6/2020 | Ramones | H04N 5/2252 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

OVERLAPPING FIELDS OF VIEW OF DUAL CAMERA MODULES

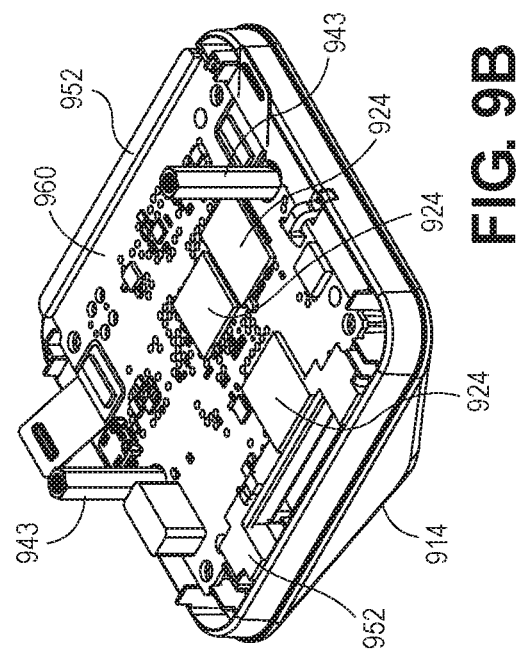
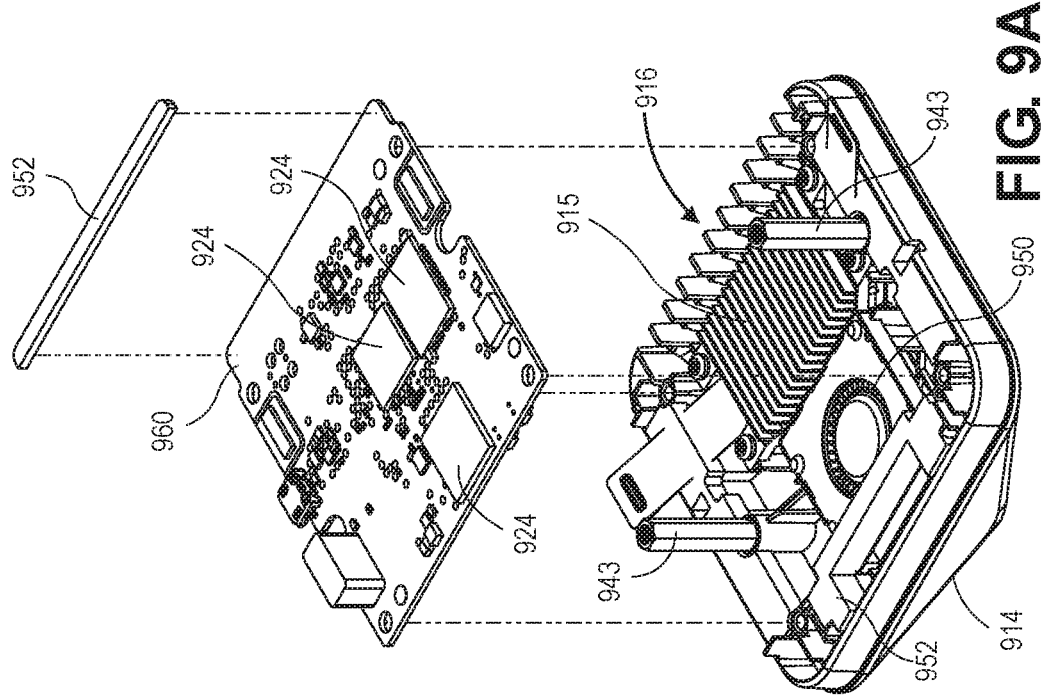
FIG. 9B
FIG. 9A

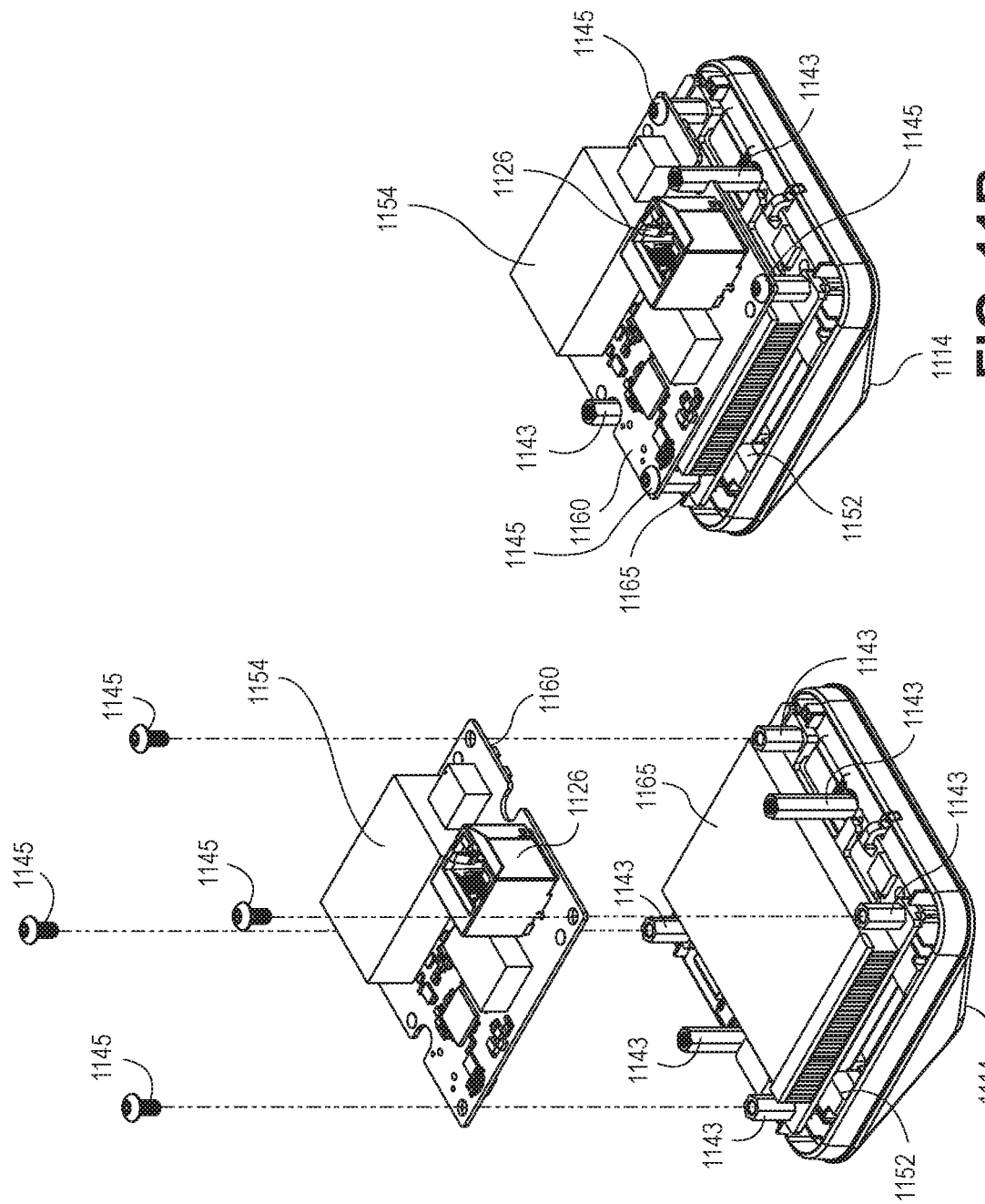

DUAL CAMERA MODULE SYSTEMS

BACKGROUND

Imaging devices, such as digital cameras, are frequently used in bricks-and-mortar commercial settings. In a materials handling facility, such as a retail store or establishment, a digital camera may be provided in one or more locations and configured to include portions of the materials handling facility within its field of view. Images captured by the digital camera may be processed to identify one or more customers or other personnel within the materials handling facility, to detect movements of such customers or personnel, or to identify items that are removed from storage units by such customers or personnel, or placed on such storage units by such customers or personnel.

Imaging devices that are provided within a materials handling facility are commonly mounted in elevated configurations, e.g., on ceilings or walls, in order to ensure that the fields of view of the imaging devices include accessible floor spaces, storage units or other areas. Mounting imaging devices on ceiling or walls, however, typically requires individual mounts and power and/or network connections for each of the imaging devices. Furthermore, because fields of view of imaging devices are centered about their respective axes of orientation, and defined as functions of their respective focal lengths, locations at which the imaging devices are mounted must be selected in order to ensure that specific areas of the materials handling facility are appropriately covered. Moreover, like all electronic or computer-driven components, imaging devices that are mounted in elevated configurations must be maintained at temperatures within acceptable bands or ranges, in order to ensure that the imaging devices operate properly, or in an optimal manner.

BRIEF DESCRIPTION OF THE DRAWINGS

FIGS. 9A and 9B are views of aspects of one dual camera module system in accordance with implementations of the present disclosure.

FIGS. 11A and 11B are views of aspects of one dual camera module system in accordance with implementations of the present disclosure.

DETAILED DESCRIPTION

As is set forth in greater detail below, the present disclosure is directed to systems that include two digital camera modules or other imaging devices and are configured for mounting to ceilings or other elevated locations within retail establishments or other materials handling facilities. More specifically, the present disclosure is directed to systems including pairs of digital camera modules that are mounted within housings and aligned with axes of orientation at non-parallel angles, and with fields of view that partially overlap. The dual camera module systems further include internal components for receiving power and forming network connections within such housings, as well as fans or blowers for circulating cooling air flow through the housings to remove heat generated by the camera modules.

Figure 1A:
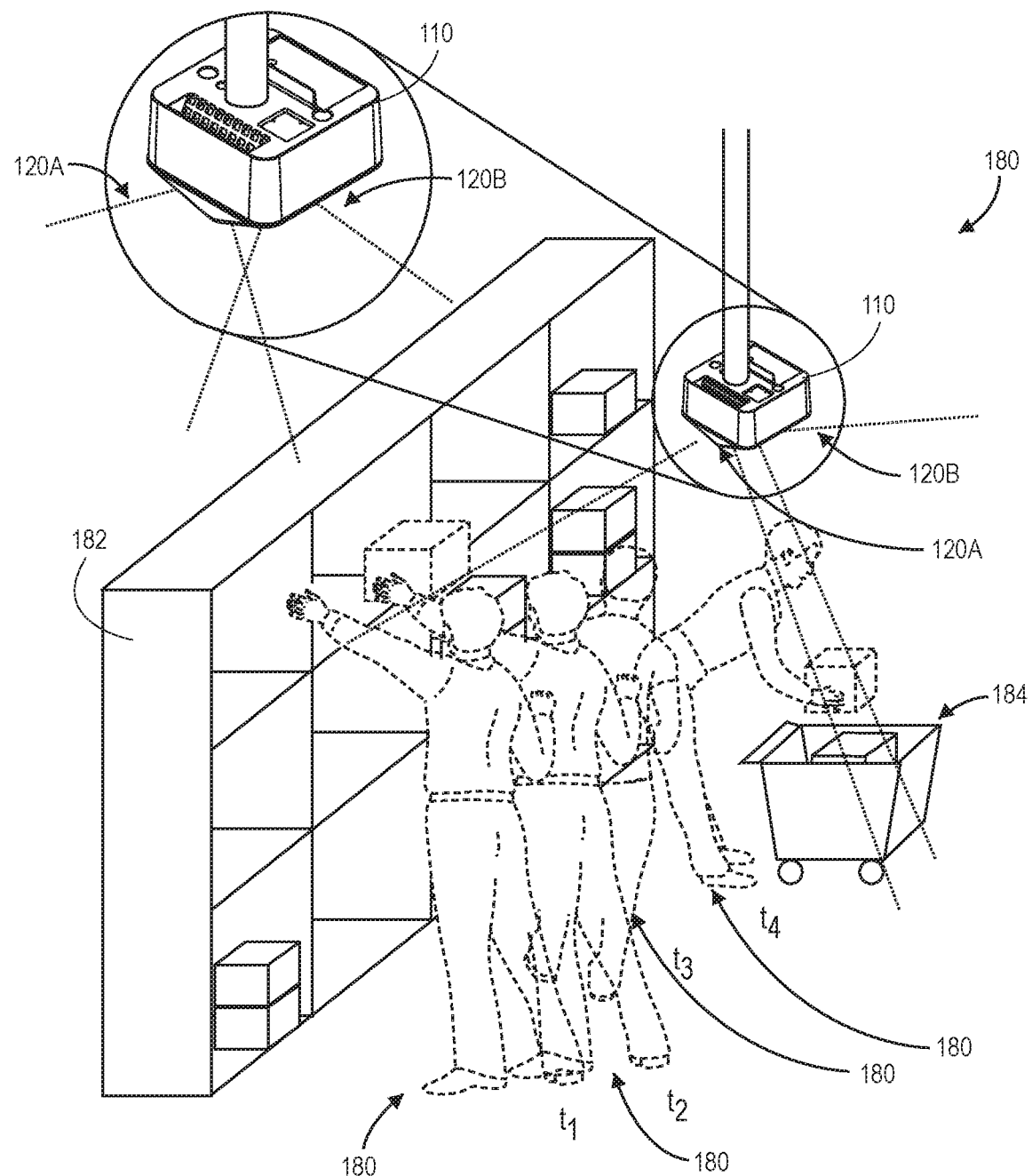
FIGS. 1A through 1D are views of aspects of one system including a dual camera module system in accordance with implementations of the present disclosure.
Figure 1B:
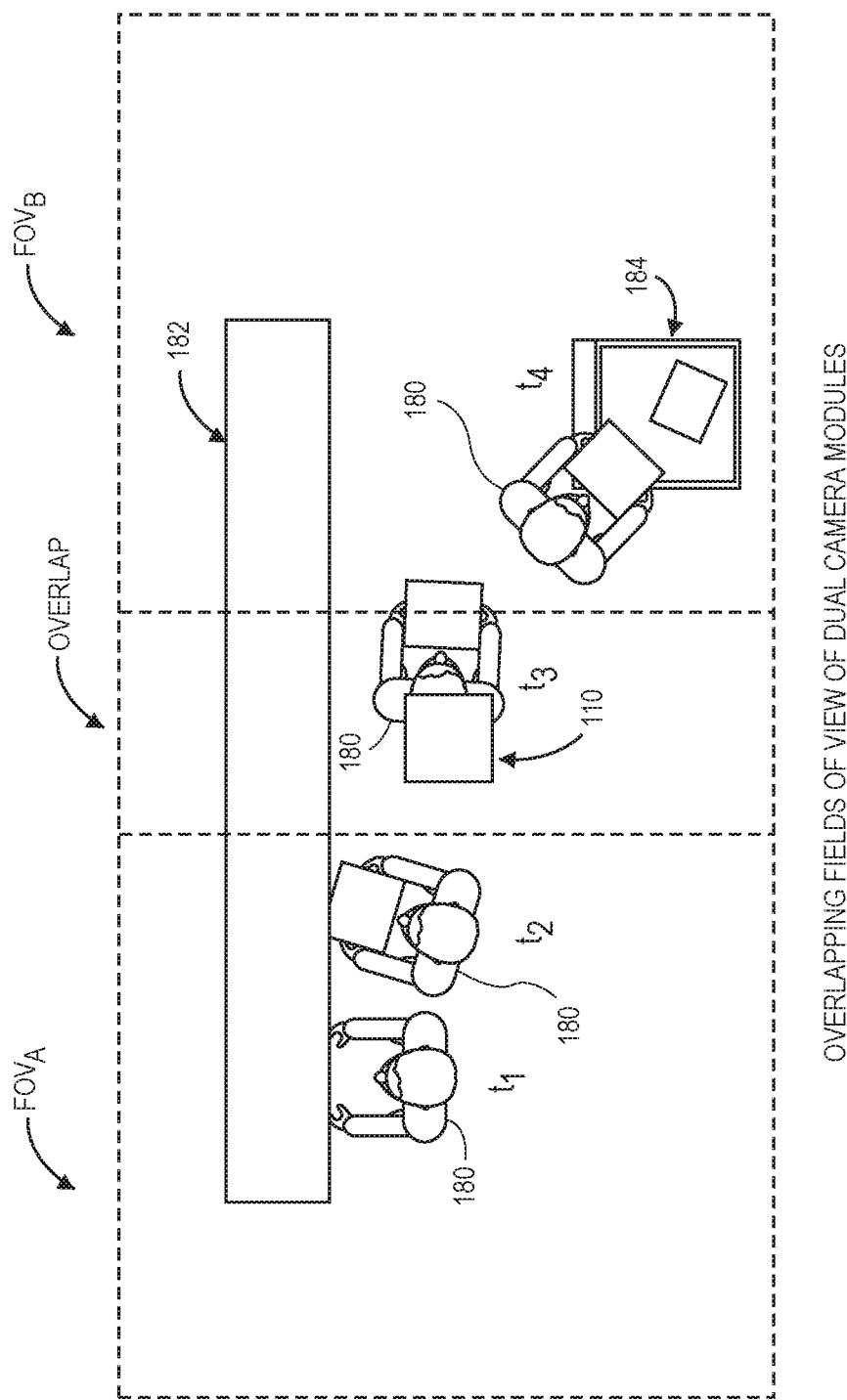

Referring to FIGS. 1A through 1D, views of aspects of one system including a dual camera module system 110 in accordance with implementations of the present disclosure are shown. As is shown in FIGS. 1A and 1B, a dual camera module system 110 is mounted to a ceiling or another elevated surface or fixture within a materials handling facility, or any other facility located in any environment or scene. The dual camera module system 110 includes a pair of digital camera modules 120A, 120B that are provided within a housing or other structure formed from one or more parts, e.g., an upper frame and a lower frame, and have fields of view $FOV_A$, $FOV_B$, which overlap at least in part below the dual camera module system 110, and extend normal to angled lower surfaces or panels of the housing. Each of the camera modules 120A, 120B may be configured to capture color images, grayscale images, black-and-white images, or any other type or form of imaging data (e.g., depth images).

In some implementations, the camera modules 120A, 120B may include one or more sensors that are configured to capture visual imaging data at relatively high levels of resolution, e.g., eight to nine megapixels per image, and at relatively high frame rates, e.g., fifteen or more frames per second (fps). Such sensors may include arrays of photodetectors or photosensitive components such as charge coupled devices ("CCD"), complementary metal-oxide sensors ("CMOS"), photodiodes, or the like. The sensors may capture light reflected from objects and assign one or more quantitative values (e.g., red, green, blue or other color values, or distances or ranges to such objects) to aspects of the reflected light. Alternatively, or additionally, in some implementations, the camera modules 120A, 120B may be configured to capture any other imaging data, such as depth imaging data, or visual imaging data at any levels of resolution or frame rates.

For example, as is shown in FIGS. 1A and 1B, a shelving unit 182 and/or a cart 184 or other accessory system are located within the fields of view $FOV_A$, $FOV_B$ of the camera modules 120A, 120B. The shelving unit 182 may be a structure or fixture including one or more shelves that rests on or is provided in association with floor space at the materials handling facility. Alternatively, or additionally, the materials handling facility may include one or more tables or other substantially planar surfaces or systems for accommodating one or more items thereon. The cart 184 may be any fixed or mobile accessory system that is associated with the shelving unit 182 and/or the one or more items thereon, and rests on the floor space within a vicinity of the shelving unit 182.

The camera modules 120A, 120B are aligned with axes of orientation provided at non-parallel angles. The camera modules 120A, 120B are configured to capture images as an actor 180 executes one or more interactions with the shelving unit 182 and/or the cart 184, e.g., by removing an item from the shelving unit 182 and placing the item in the cart 184, at times $t_1$, $t_2$, $t_3$, $t_4$, and others. Alternatively, any number of other two-dimensional or three-dimensional storage units for accommodating items and/or containers of such items may be located within the fields of view $FOV_A$, $FOV_B$, including but not limited to one or more aisles, rows, bays, slots, bins, racks, tiers, bars, hooks, cubbies or other like systems, or any other appropriate regions or stations, which may be flat or angled, stationary or mobile, and of any shape or size.

The dual camera module system 110 is in communication with one or more external devices or systems, e.g., by one or more network connections (not shown). By featuring a pair of digital cameras, viz., the camera modules 120A, 120B, and aligning the digital cameras with non-parallel axes of orientation extending normal to and away from the angled lower surfaces or panels of the housing, the dual camera module system 110 is able to capture imaging data from a larger area than a system that includes just a single camera module, thereby reducing hardware, installation and maintenance costs. Additionally, in some implementations, the dual camera module system 110 may be self-powered, e.g., by one or more internal or onboard power sources, such as batteries or fuel cells. In some other implementations, however, the dual camera module system 110 may receive alternating current (or AC) or direct current (or DC) power from one or more external power sources, e.g., by one or more conductors or other connectors. For example, the dual camera module system 110 may receive power by a dedicated connection to such sources, e.g., according to a Power over Ethernet (or "PoE") standard or system that may also be utilized to transfer information or data to or from the dual camera module system 110.

Figure 1C:
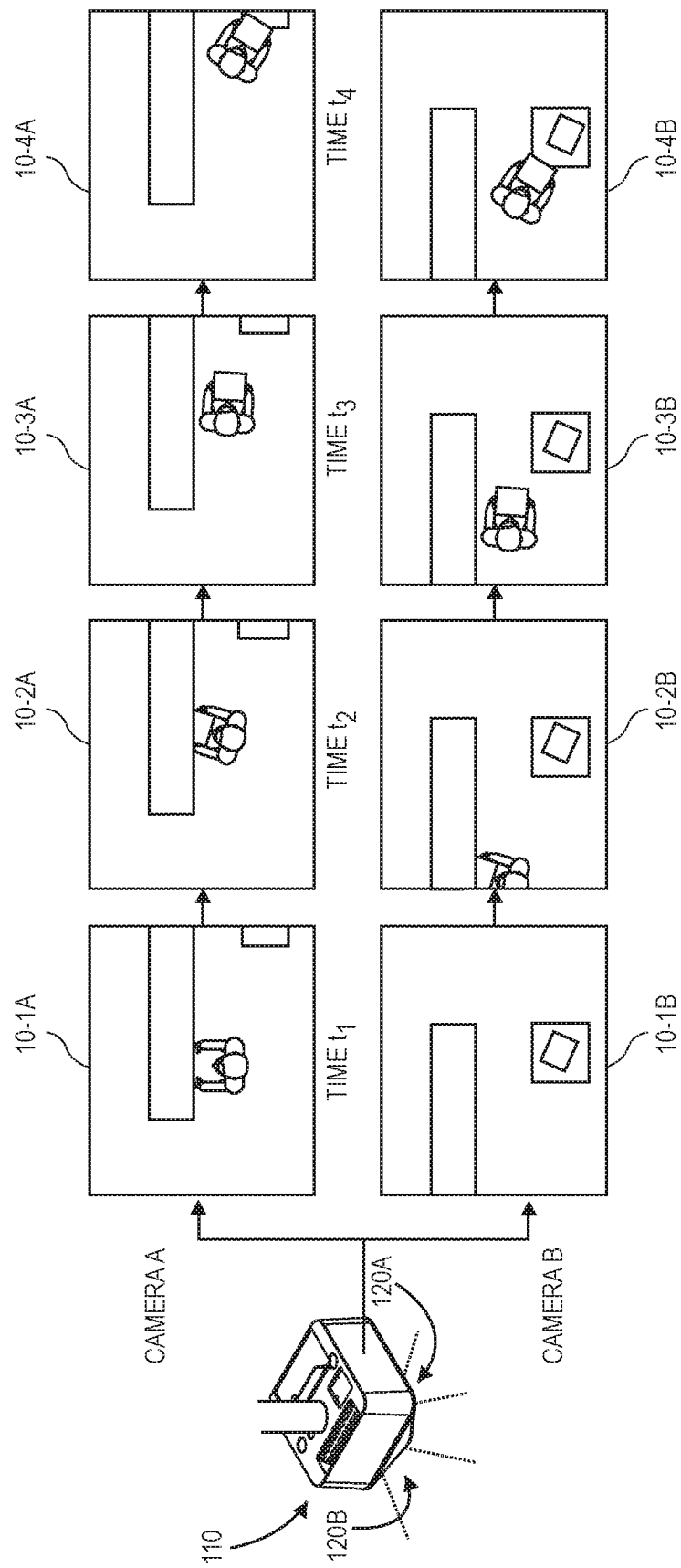

As is shown in FIG. 1C, the camera modules 120A, 120B of the dual camera module system 110 are configured to independently capture imaging data regarding activity occurring within the fields of view $FOV_A$, $FOV_B$, and to utilize the imaging data captured thereby for any relevant purpose. For example, as is shown in FIG. 1C, the camera module 120A captures a series of images 10-1A, 10-2A, 10-3A, 10-4A at times $t_1$, $t_2$, $t_3$, $t_4$, as the actor 180 executes interactions with the shelving unit 182 and the cart 184. Likewise, and as is also shown in FIG. 1C, the camera module 120B captures a series of images 10-1B, 10-2B, 10-3B, 10-4B at the times $t_1$, $t_2$, $t_3$, $t_4$.

Figure 1D:
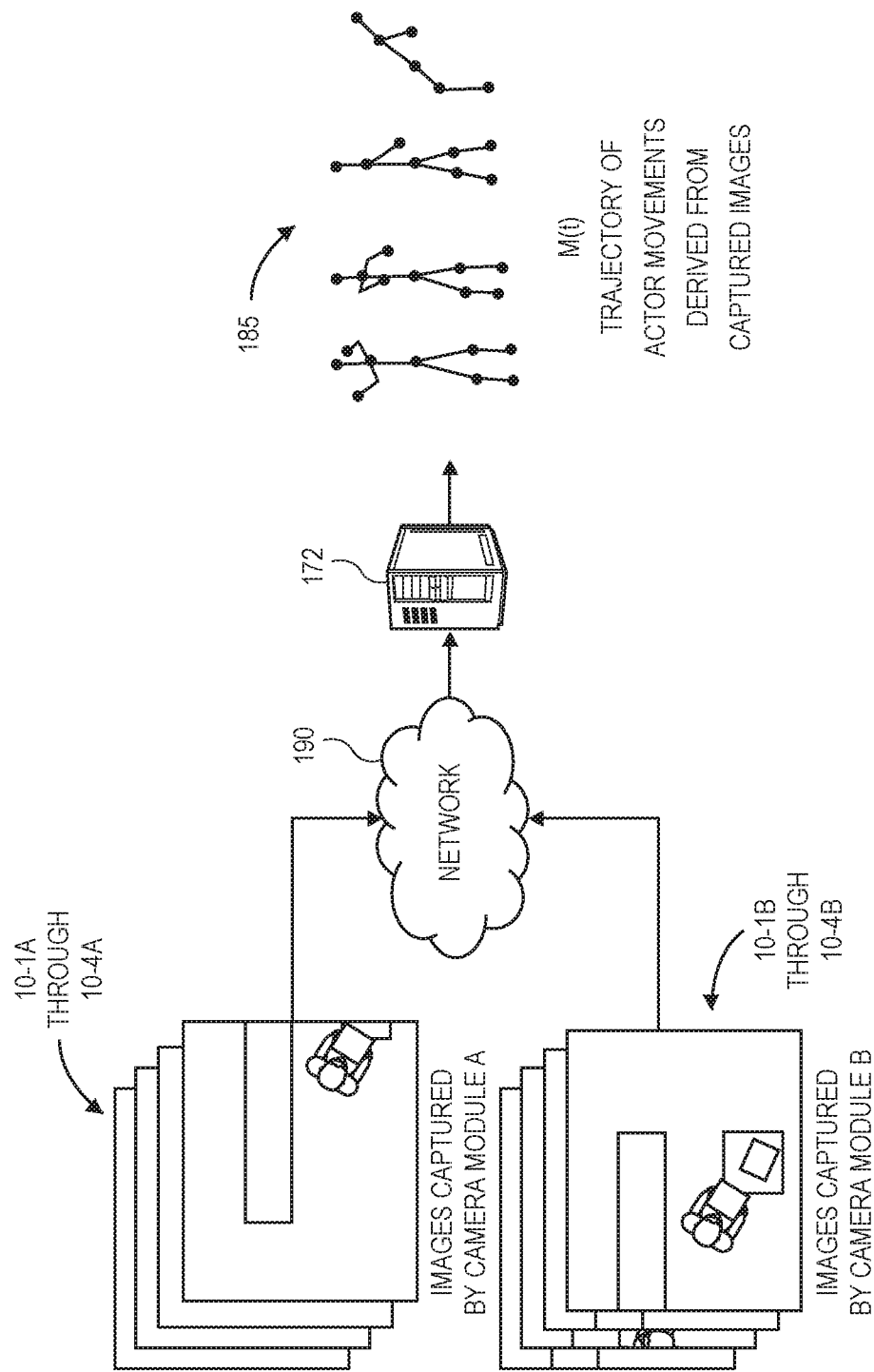

Images captured by the camera modules 120A, 120B may be utilized for any purpose. As is shown in FIG. 1D, the images 10-1A, 10-2A, 10-3A, 10-4A and the images 10-1B, 10-2B, 10-3B, 10-4B may be provided to a server 172 or other computer device or system over a network 190, which may include the Internet in whole or in part. For example, in some implementations, the server 172 or other device or system may process the images 10-1A, 10-2A, 10-3A, 10-4A and the images 10-1B, 10-2B, 10-3B, 10-4B to generate trajectories representing locations, movements or orientations of any actors depicted therein, viz., a trajectory M(t) of the actor 180, or any other record of activity occurring with the fields of view $FOV_A$, $FOV_B$. Alternatively, or additionally, the server 172 may further receive any other information or data captured by one or more other sensors (not shown), including but not limited to LIDAR sensors, RFID sensors, load sensors, or any other type or form of sensors, which may capture information or data and also provide the information or data to the server 172 over the network 190.

Accordingly, the dual camera module systems of the present disclosure may be provided in any environment or scene, such as a retail establishment or another materials handling facility, and aligned to capture imaging data occurring at such environments or scenes. The dual camera module systems of the present disclosure may be mounted above such scenes, such as to ceilings, false ceilings (e.g., to poles, frames, panels or joints), trusses, beams, or other systems. For example, one or more of the dual camera module systems may be mounted directly to such systems, or to one or more threaded tie rods or other components descending from such systems, or in any other manner. Alternatively, in some implementations, the dual camera module systems of the present disclosure may be mounted to an underside of a structure, such as a shelf, an arch or a bridge, or to an elevated system such as a pole or stanchion. In still other implementations, the dual camera module systems may be mounted to a wall or other vertical surface in an alignment such that axes of orientation of the camera modules extend within horizontal planes, or planes that are aligned at angles other than vertical.

Reflected light may be captured or detected by an imaging device if the reflected light is within the imaging device's field of view, which is defined as a function of a distance between a sensor and a lens within the imaging device, viz., a focal length, as well as a location of the imaging device and an angular orientation of the imaging device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, an imaging device may be configured in a fixed position, or with a fixed focal length (e.g., fixed-focus lenses) or angular orientation. Alternatively, a imaging device may include one or more actuated or motorized features for adjusting a position of the imaging device, or for adjusting either the focal length (e.g., zooming the imaging device) or the angular orientation (e.g., the roll angle, the pitch angle or the yaw angle) of the imaging device, by causing a change in a distance between the sensor and the lens (e.g., optical zoom lenses or digital zoom lenses), a change in a location of the imaging device, or a change in one or more of the angles defining an angular orientation.

Figure 2A:
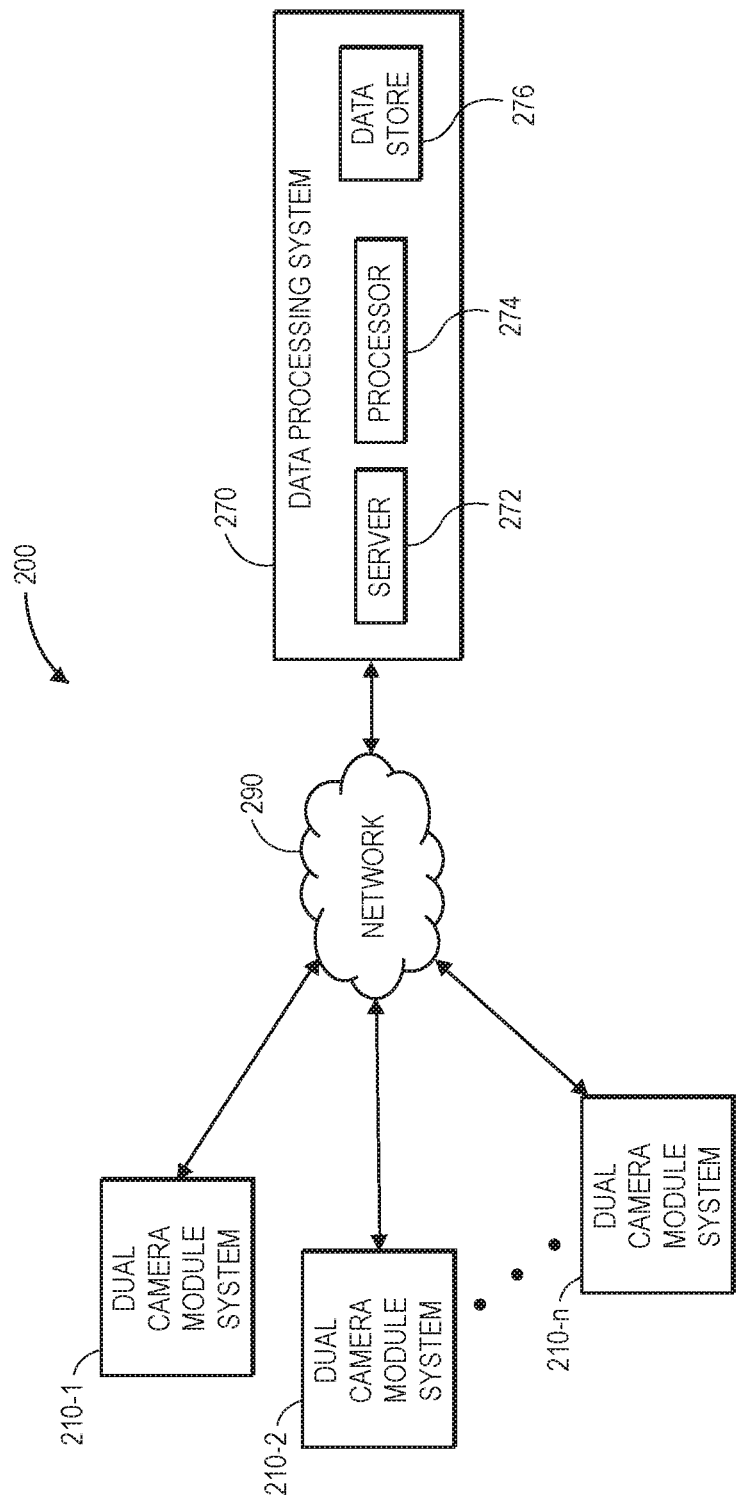
FIGS. 2A and 2B are block diagrams of one system including a dual camera module system in accordance with implementations of the present disclosure.
Figure 2B:
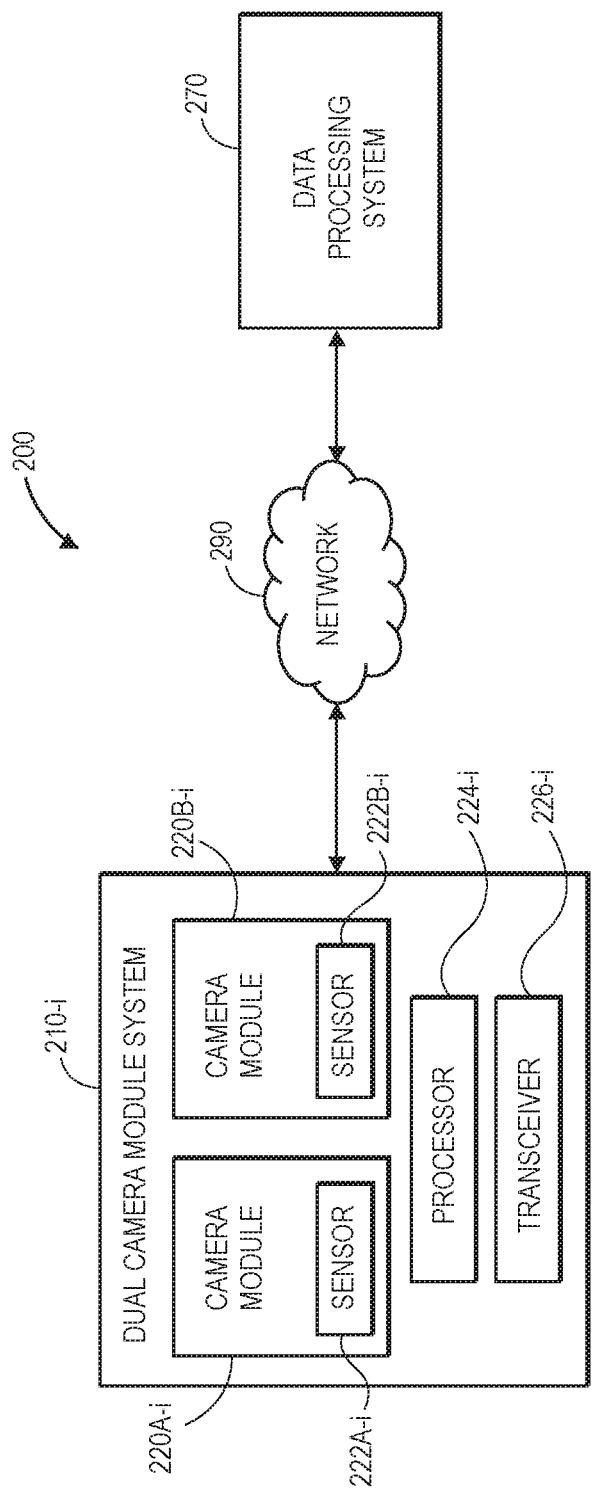

Referring to FIGS. 2A and 2B, block diagrams of one system including a dual camera module system in accordance with implementations of the present disclosure are shown. Except where otherwise noted, reference numerals preceded by the number "2" shown in FIGS. 2A and 2B indicate components or features that are similar to components or features having reference numerals preceded by the number "1" shown in FIGS. 1A through 1D.

The system 200 of FIGS. 2A and 2B includes a plurality of dual camera module systems 210-1, 210-2 . . . 210-n and a data processing system 270 that are connected to one another over a network 290, which may include the Internet, in whole or in part. As is shown in FIG. 2B, a representative one of the dual camera module systems 210-i includes a pair of camera modules 220A-i, 220B-i, each having one or more sensors 222A-i, 222B-i, as well as one or more processors 224-i and one or more transceivers 226-i or other communications systems.

The dual camera module systems 210-1, 210-2 . . . 210-n of the present disclosure may be any devices or systems that are configured for mounting to one or more elevated surfaces above an environment or scene, such as a retail establishment or another materials handling facility, and for capturing imaging data regarding events occurring within the environment or scene. The dual camera module systems 210-1, 210-2 . . . 210-n of the present disclosure may include two or more camera modules, viz., the camera modules 220A-i, 220B-i, that are mounted within housings and feature non-parallel axes of orientation extending normal to and away from the housings.

The camera modules 220A-i, 220B-i may be any form of optical recording devices that may be used to photograph or otherwise record imaging data of structures, facilities, terrain or any other elements appearing within their respective fields of view. The sensors 222A-i, 222B-i may be any sensors, such as color sensors, grayscale sensors, black-and-white sensors, or other visual sensors, as well as depth sensors or any other type of sensors, that are configured to capture visual imaging data (e.g., textures) or depth imaging data (e.g., ranges) to objects within one or more fields of view of the camera modules 220A-i, 220B-i. In some implementations, the sensors 222A-i, 222B-i may have single elements or a plurality of photoreceptors or photosensitive components (e.g., a CCD sensor, a CMOS sensor, or another sensor), which may be typically arranged in an array. Light reflected from objects within fields of view of the camera modules 220A-i, 220B-i may be captured by the sensors 222A-i, 222B-i, and quantitative values, e.g., pixels, may be assigned to one or more aspects of the reflected light. The illuminators 222-i may be any system such as a laser system or a light-emitting diode (or "LED") for illuminating a portion of an environment or scene appearing within a field of view of the dual camera module system 210-i, e.g., by infrared or near-infrared light, such as light with wavelengths ranging from approximately seven hundred to approximately one thousand nanometers (700-1000 nm).

In addition to the one or more sensors 222A-i, 222B-i, the processors 224-i and the transceiver 226-i, the camera modules 220A-i, 220B-i may also include any number of other components that may be required in order to capture, analyze and/or store imaging data, including but not limited to one or more lenses, memory or storage components, photosensitive surfaces, filters, chips, electrodes, clocks, boards, timers, power sources, connectors or any other relevant features (not shown). Additionally, in some implementations, each of the sensors 222A-222B-i may be provided on a substrate (e.g., a circuit board) and/or in association with a stabilization module having one or more springs or other systems for compensating for motion of the dual camera module system 210-i or the sensors 222A-i, 222B-i, or any vibration affecting the sensors 222A-i, 222B-i.

The camera modules 220A-i, 220B-i may capture imaging data in the form of one or more still or moving images (e.g., streams of visual and/or depth image frames), along with any relevant audio signals or other information (e.g., position data). The dual camera module system 210-i and/or the camera modules 220A-i, 220B-i may also include one or more illuminators (not shown), such as laser systems or light-emitting diodes (or "LED") for illuminating portions of environments or scenes appearing within the fields of view of the camera modules 220A-i, 220B-i, as necessary.

The processors 224-i may be configured to process imaging data captured by one or more of the sensors 222A-i, 222B-i. For example, in some implementations, the processors 224-i may be configured to execute any type or form of machine learning tools or technique, e.g., an artificial neural network.

The transceivers 226-i enable the dual camera module system 210-i to communicate with the data processing system 270 or any other external devices, systems or components by way of the network 290. In some implementations, the dual camera module system 210-i may be configured to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, either by way of the servers 272 or over the network 290 directly.

The dual camera module systems 210-1, 210-2 . . . 210-n of FIG. 2A may be deployed in any number, and may be homogenous or heterogeneous in nature, in accordance with the present disclosure. For example, one or more of the dual camera module systems 210-1, 210-2 . . . 210-n may include camera modules 220A-i, 220B-i having both visual (e.g., color, grayscale or black-and-white) and depth sensors 222A-i, 222B-i. Alternatively, one or more of the dual camera module systems 210-1, 210-2 . . . 210-n may include camera modules 220A-i, 220B-i having just a visual sensor 222A-i, 222B-i, or just a depth sensor 222A-i, 222B-i. For example, one or more of the dual camera module systems 210-1, 210-2 . . . 210-n may include an RGB color camera, a still camera, a motion capture/video camera or any other type or form of camera. In other implementations, one or more of the dual camera module systems 210-1, 210-2 . . . 210-n may include depth-sensing cameras, such as an RGBD or RGBz camera. In still other implementations, one or more of the dual camera module systems 210-1, 210-2 . . . 210-n may include a thermographic or infrared (IR) camera. Additionally, in some implementations, one or more of the dual camera module systems 210-1, 210-2 . . . 210-n may simply be camera modules that include a lens and an image sensor configured to convert an optical image obtained using the lens of the camera into a digital signal or digital representation of the image (generally referred to herein as imaging data).

The dual camera module systems 210-1, 210-2 . . . 210-n may also include manual or automatic features for modifying their respective fields of view or orientations. For example, one or more of the camera modules 220A-i, 220B-i of a dual camera module system 210-i may include one or more motorized features for adjusting positions of the camera modules 220A-i, 220B-i, or for adjusting either a focal length or an angular orientation of the camera modules 220A-i, 220B-i, by causing changes in the distance between the sensor and the lens (e.g., optical zoom lenses or digital zoom lenses), or changes in one or more of the angles defining the angular orientation.

Some of the dual camera module systems 210-1, 210-2 . . . 210-n may digitally or electronically adjust images captured from fields of view of the respective camera modules 220A-i, 220B-i, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Additionally, the processors 224-$i$ or other components of the dual camera module systems 210-1, 210-2 . . . 210-$n$ may be configured to recognize characteristics of stationary or moving objects or portions thereof depicted in one or more digital images, and to match such characteristics against information regarding contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects. For example, in some implementations, the processors 224-$i$ may be programmed to execute one or more machine learning algorithms, tools or techniques.

In some implementations, components of the dual camera module system 210 may be self-powered, e.g., by one or more internal or onboard power sources, such as batteries or fuel cells. In some other implementations, however, components of the dual camera module system 210 may receive power of any type or form from one or more external power sources, e.g., by one or more conductors or other connectors. Accordingly, the dual camera module system 210 may include any number of transformers, converters (e.g., step-down converters), capacitors, resistors, inductors, transistors or other components for utilizing or altering power received from such external power sources. Furthermore, in some implementations, the dual camera module system 210 may be configured to receive power via one or more connections or conductors that may also be provided for one or more other purposes, such as according to a PoE standard or system that may also be utilized to receive information or data from one or more external devices or systems, or to transfer information or data to one or more external devices or systems, e.g., over the network 290.

Although the system 200 of FIG. 2A includes boxes corresponding to three dual camera module systems 210-1, 210-2 . . . 210-$n$, those of ordinary skill in the pertinent arts will recognize that any number or type of dual camera module systems may be operated in accordance with the present disclosure. For example, in some implementations, the system 200 may include dozens or even hundreds of dual camera module systems 210-1, 210-2 . . . 210-$n$ of any type or form, which may be mounted in regular or irregular configurations over or in association with a materials handling facility or other environment or scene in any manner.

The data processing system 270 includes one or more physical computer servers 272 having one or more computer processors 274 and any number of data stores 276 (e.g., databases) associated therewith, as well as provided for any specific or general purpose. For example, the data processing system 270 of FIGS. 2A and 2B may be independently provided for the exclusive purpose of receiving, analyzing or storing imaging data or other information or data received from the dual camera module systems 210-1, 210-2 . . . 210-$n$ or, alternatively, provided in connection with one or more physical or virtual services that are configured to receive, analyze or store such imaging data or other information or data, as well as to perform one or more other functions. In some implementations, the data processing system 270 may be associated with a materials handling facility, or any other physical or virtual facility.

The servers 272 may be connected to or otherwise communicate with the processors 274 and the data stores 276, which may store any type of information or data, including but not limited to acoustic signals, information or data relating to imaging data, or information or data regarding environmental conditions, operational characteristics, or positions, for any purpose. The servers 272, the processors 274 and/or the data stores 276 may also connect to or otherwise communicate with the network 290, through the sending and receiving of digital data. For example, the data processing system 270 may include any facilities, stations or locations having the ability or capacity to receive and store information or data, such as media files, in one or more data stores, e.g., media files received from the dual camera module systems 210-1, 210-2 . . . 210-$n$, or from one or more other external computer systems (not shown) via the network 290. In some implementations, the data processing system 270 may be provided in a physical location. In other such implementations, the data processing system 270 may be provided in one or more alternate or virtual locations, e.g., in a "cloud"-based environment. In still other implementations, the data processing system 270 may be provided onboard one or more vehicles, e.g., an unmanned aerial vehicle.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some implementations, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The dual camera module systems 210-1, 210-2 . . . 210-$n$ and/or the data processing system 270 may use any web-enabled or Internet applications or features, or any other client-server applications or features including E-mail or other messaging techniques, to connect to the network 290, or to communicate with one another. For example, the dual camera module systems 210-1, 210-2 . . . 210-n may be adapted to transmit information or data in the form of synchronous or asynchronous messages to the data processing system 270 or to any other computer device in real time or in near-real time, or in one or more offline processes, via the network 290. Those of ordinary skill in the pertinent art would recognize that the dual camera module systems 210-1, 210-2 . . . 210-n or the data processing system 270 may operate or be operated by any of a number of computing devices that are capable of communicating over the network, including but not limited to set-top boxes, smart speakers, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processors 224-i or the processor 274, or any other computers or control systems utilized by the dual camera module systems 210-1, 210-2 . . . 210-n or the data processing system 270, and having sequences of instructions which, when executed by a processor (e.g., a central processing unit, or "CPU"), cause the processor to perform all or a portion of the functions, services and/or methods described herein. Such computer-executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose.

As is discussed above, the dual camera module systems of the present disclosure may include imaging devices and other components that are provided in housings that are configured to be mounted to ceilings or to other structures that are positioned above areas of interest, such as above one or more areas of a retail establishment or another materials handling facility. Referring to FIGS. 3A through 3H, views of one dual camera module system in accordance with implementations of the present disclosure are shown. Except where otherwise noted, reference numerals preceded by the number "3" shown in FIGS. 3A through 3H indicate components or features that are similar to components or features having reference numerals preceded by the number "2" shown in FIGS. 2A and 2B or by the number "1" shown in FIGS. 1A through 1D.

Figure 3B:
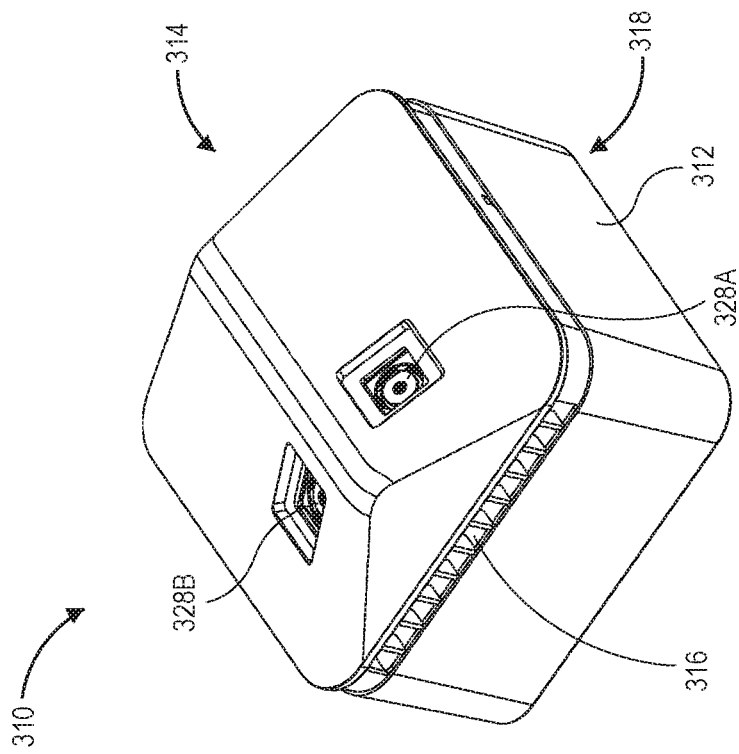
FIGS. 3A through 3H are views of one dual camera module system in accordance with implementations of the present disclosure.
Figure 3A:
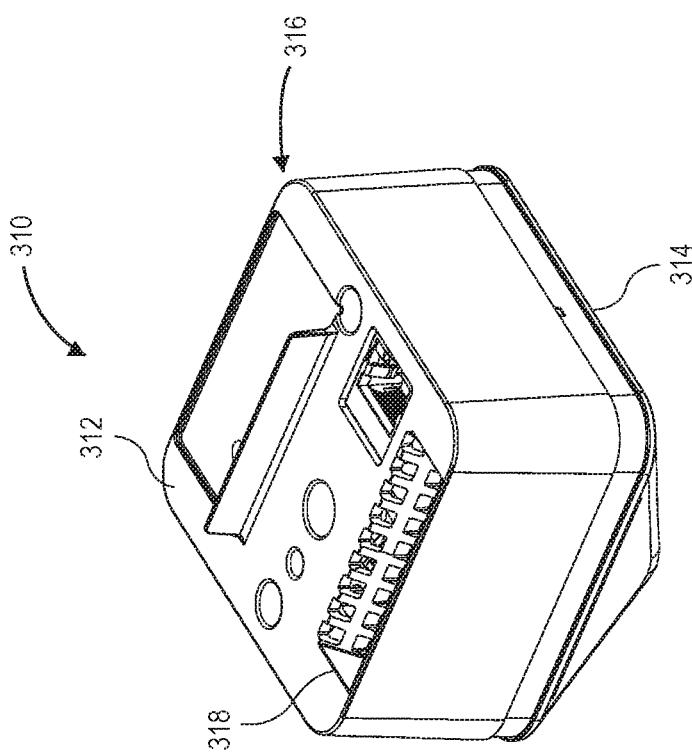
Figure 3D:
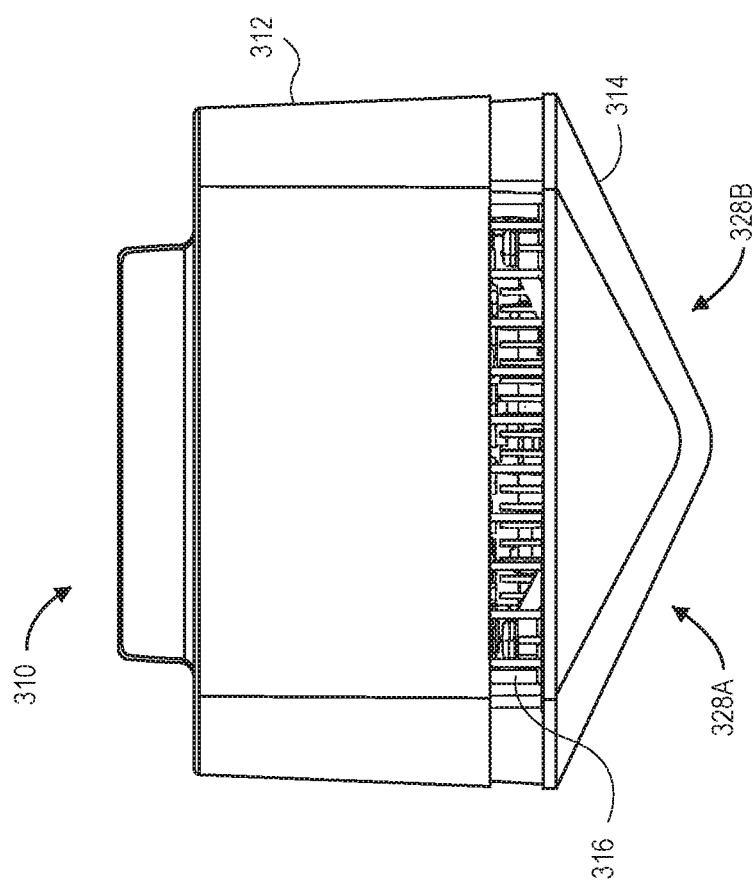
Figure 3C:
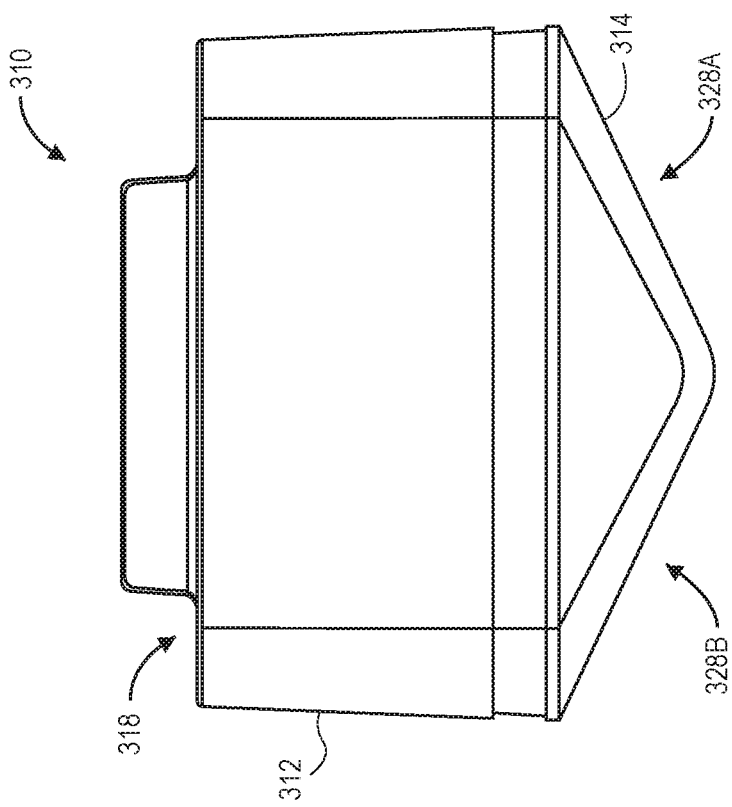
Figure 3F:
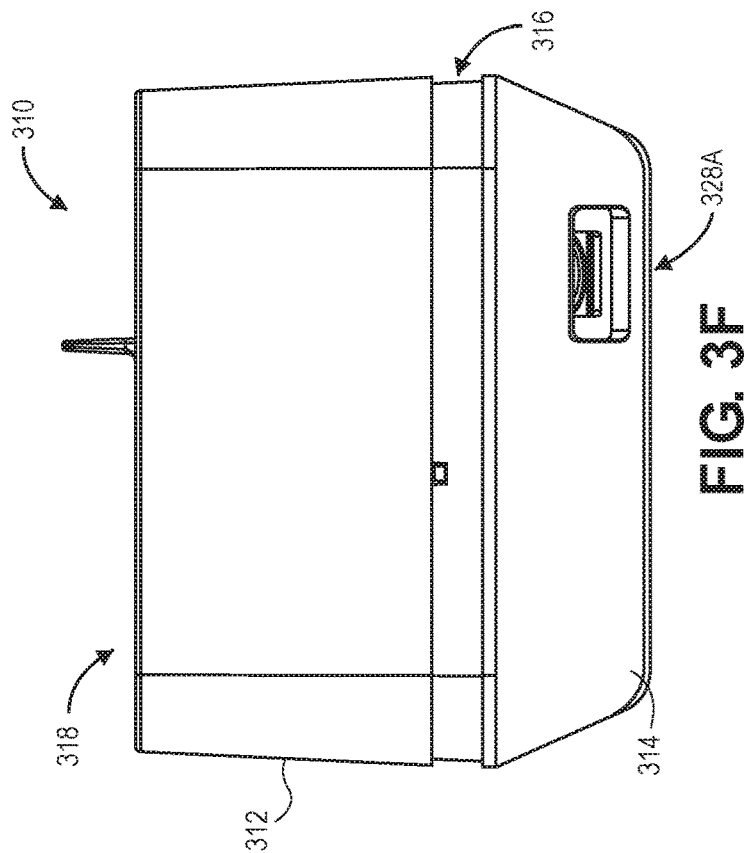
Figure 3E:
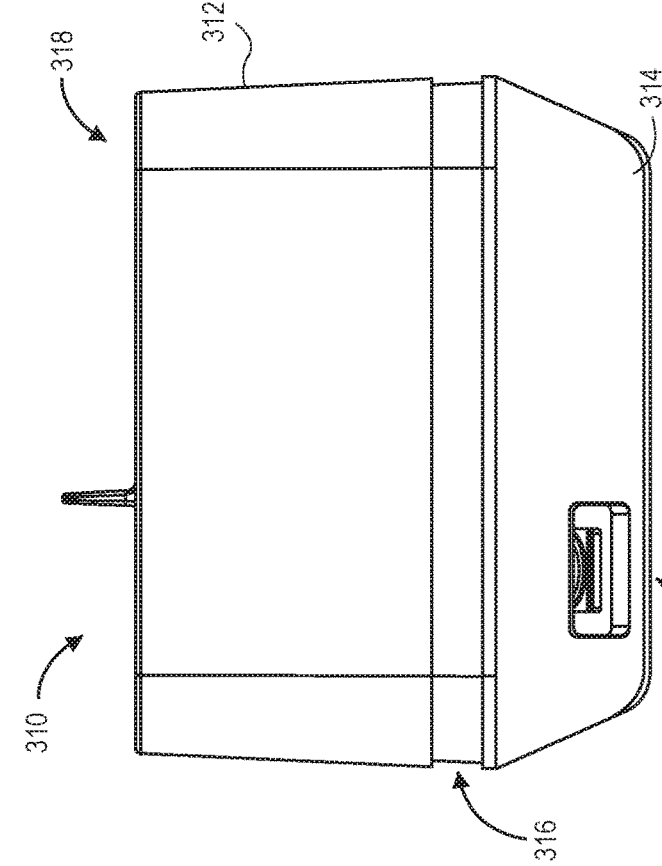
Figure 3H:
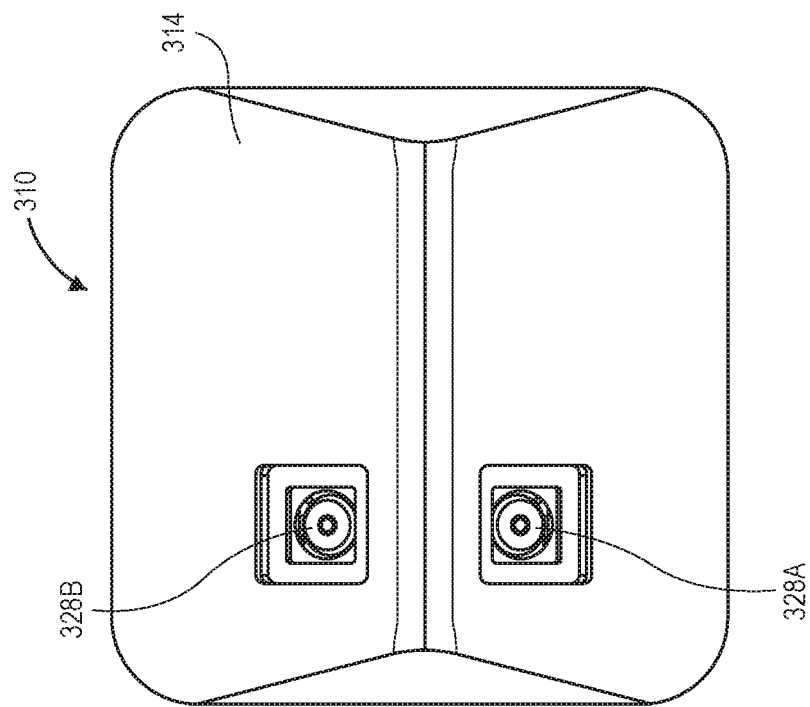
Figure 3G:
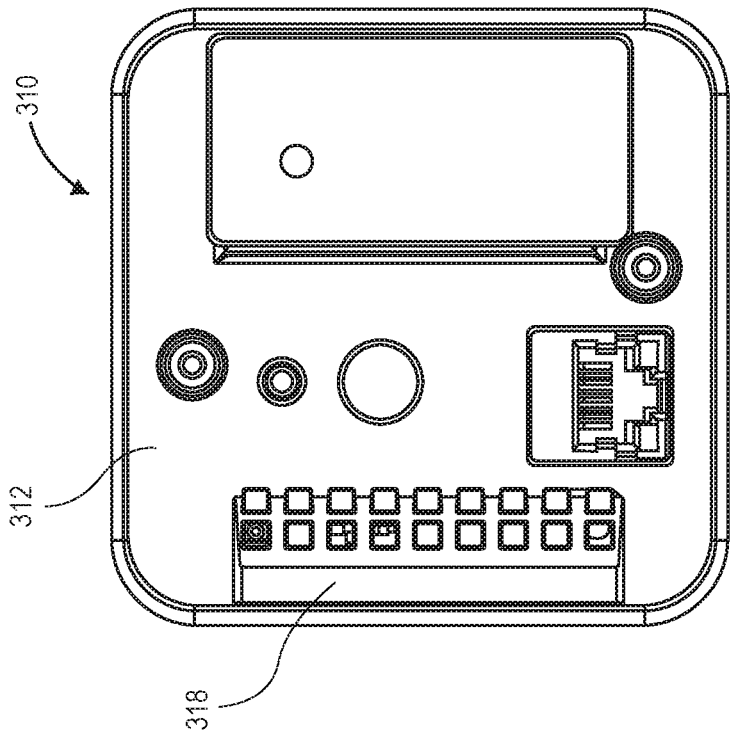

FIG. 3A is a top perspective view of a dual camera module system 310. FIG. 3B is a bottom perspective view of the dual camera module system 310. FIGS. 3C and 3D are front and rear views, respectively, of the dual camera module system 310. FIGS. 3E and 3F are left and right views, respectively, of the dual camera module system 310. FIGS. 3G and 3H are top and bottom views, respectively, of the dual camera module system 310.

As is shown in FIGS. 3A through 3H, the dual camera module system 310 includes an upper frame (or an upper section of a housing) 312, a lower frame (or a lower section of the housing) 314, an air flow inlet 316 and an air flow outlet 318. The upper frame 312 is configured for mounting the dual camera module system 310 to one or more surfaces, e.g., ceilings, false ceilings (such as to poles, frames, panels or joints), trusses, beams, walls, shelves, arches, bridges, stanchions or other systems, either directly or to one or more other components (e.g., a tie rod) extending therefrom, that are provided above or in association with a retail establishment or another materials handling facility.

One or more of the upper frame 312 or the lower frame 314 may act as a chassis to provide structural support for lenses, sensors, processors, circuit boards or other systems associated with digital cameras installed therein. Likewise, one or more of the upper frame 312 or the lower frame 314 may act as a cover, a case, a shroud or another system that is configured to mate with such a chassis, and to enclose such systems therein. As is shown in FIG. 3B, lenses 328A, 328B of digital cameras extend through openings in the lower frame 314, and are aligned with axes of orientation that extend normal to and away from angled surfaces or panels of the lower frame 314. The lower frame 314 is configured for mating the upper frame 312 by any number of fasteners or other systems, either independently or with one or more other components, e.g., gaskets. In some implementations (not shown in FIGS. 3A through 3H), the lenses 328A, 328B may be covered by entirely or partially transparent or translucent windows or shields.

The upper frame 312 and the lower frame 314 may be formed in any manner, such as by injection molding, and from any suitable materials. For example, in some implementations, the upper frame 312 or the lower frame 314 may be formed from polycarbonates or combinations of polycarbonates and other materials, such as acrylonitrile butadiene styrene (or "ABS"). Alternatively, in some other implementations, the upper frame 312 or the lower frame 314 may be formed from any materials other than plastics or composites, including but not limited to woods or metals. Furthermore, in some implementations, the upper frame 312 and the lower frame 314 may be combined in a single-piece construction, or may be coupled or joined by one or more hinges. Alternatively, in some other implementations, a dual camera module system need not include a housing. In such implementations, one or more components of the dual camera module system, such as circuit boards, benches, camera modules or heat sinks, may be joined to a ceiling or other surface to mount the dual camera module system in a desired orientation or configuration.

The upper frame 312 and the lower frame 314 may have any dimensions or shapes, which may be selected based on a desired size of a chassis for the components of the dual camera module system 310, or a desired size of a cavity to be defined by the upper frame 312 and the lower frame 314, based on any operational or mounting requirements, or on any other basis. For example, as is shown in FIGS. 3A, 3B, 3G and 3H, the dual camera module system 310 has a substantially square shape or cross-section with respect to a vertical axis. In some implementations, the upper frame 312 and the lower frame 314 have lengths and widths of approximately seventy-five millimeters (mm). Alternatively, the upper frame 312 and the lower frame 314 may have any shapes with respect to a vertical axis, as well as lengths and widths of any dimension.

Likewise, as is shown in FIGS. 3C, 3D, 3E and 3F, the upper frame 312 has substantially rectangular sides that define corresponding shapes or cross-sections with respect to both longitudinal and transverse axes, and is slightly tapered. For example, the length and width of the top surface or panel of the upper frame 312 of the dual camera module system 310 of FIGS. 3A through 3H are slightly shorter than the length and width of the upper frame 312 where the lower frame 314 mates with the upper frame 312. In some implementations, the upper frame 312 has a height of approximately fifty millimeters (mm). Alternatively, the upper frame 312 may have any shapes with respect to a vertical axis, as well as a height of any dimension.

Furthermore, as is shown in FIGS. 3B, 3C and 3D, the lower frame 314 includes lower sections that descend below a perimeter of the upper frame 312 and are provided at an obtuse dihedral angle. For example, in some implementations, the lower frame 314 may include lower sections that are joined at a dihedral angle of approximately two hundred twenty-five degrees (225°). The slopes or angles of the lower sections may be selected on any basis, such as a desired axis of orientation of the camera modules or lenses 328A, 328B provided therein and extending normal therefrom, or a desired coverage of the fields of view extending from the lenses 328A, 328B.

Additionally, in some implementations, the lower frame 314 may also include all or portions of the sides that are described above with respect to the upper frame 312 that are provided at any slope or angle with respect to horizontal. For example, in some implementations, the upper frame 312 may include a single upper section, and the lower frame 314 may include not only the lower angled sections but also sides that are configured to mate with the single upper section of the upper frame 312.

As is shown in FIGS. 3A and 3G, the upper frame 312 includes a number of holes, ports or openings for mounting the dual camera module system 310 to ceilings or one or more other elevated surfaces. The upper frame 312 further includes the outlet 318, which is provided on a top surface or panel of the upper frame 312 and aligned to expel air vertically from the dual camera module system 310, thereby discharging heat from within the dual camera module system 310 to ambient.

As is shown in FIGS. 3B and 3D, the lower frame 314 further includes the inlet 316, which is provided on a right side of the lower frame 314, and is aligned to receive flows of air in a substantially horizontal direction into the cavity defined by the upper frame 312 and the lower frame 314. For example, where the dual camera module system 310 includes a fan or a blower, the dual camera module system 310 may draw air at ambient temperatures into the dual camera module system 310, and direct air across or near one or more components within the dual camera module system 310, before expelling the air from the dual camera module system 310 in a substantially vertical direction, by way of the outlet 318.

Figure 4A:
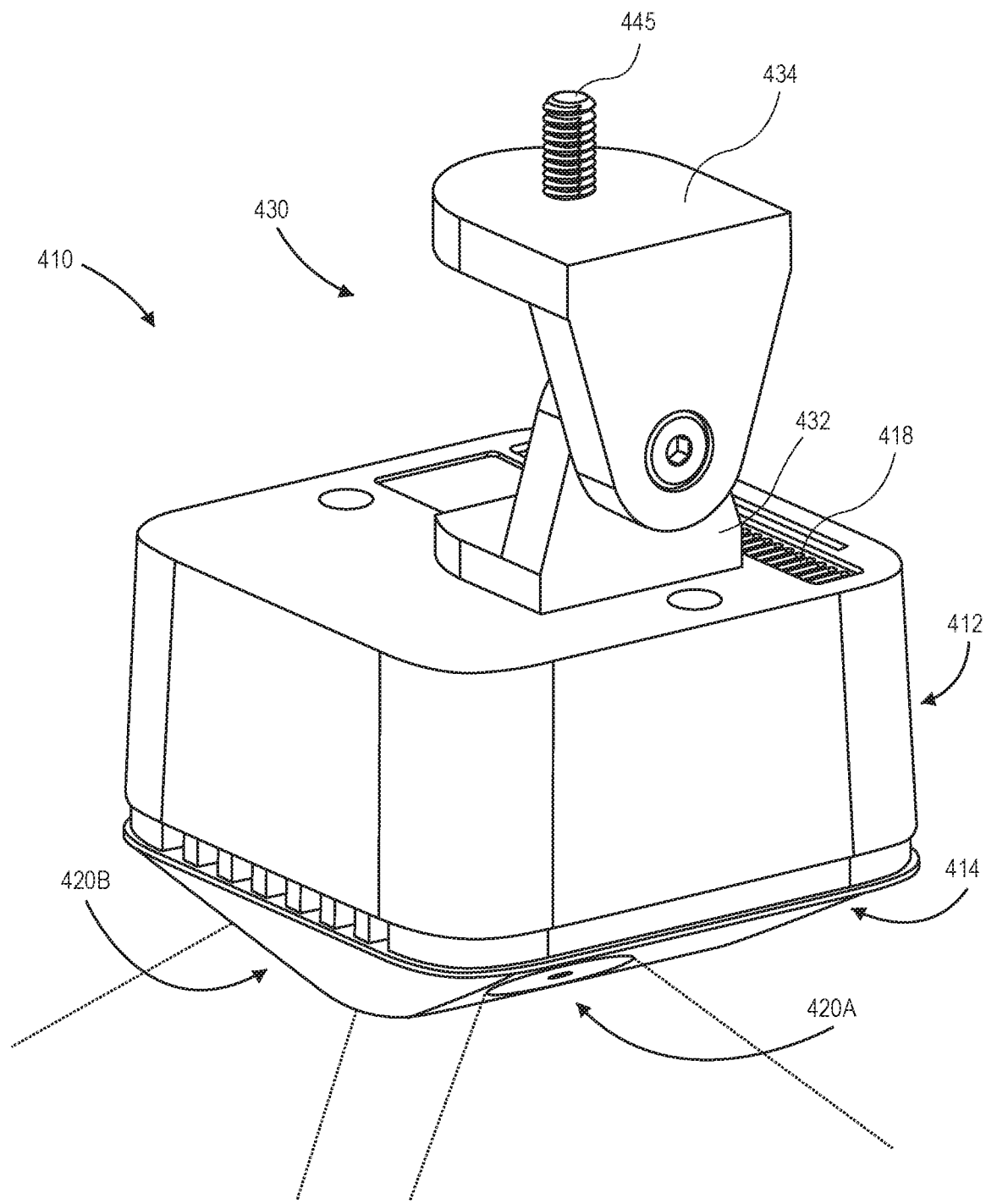
FIGS. 4A and 4B are views of aspects of one dual camera module system in accordance with implementations of the present disclosure.
Figure 4B:
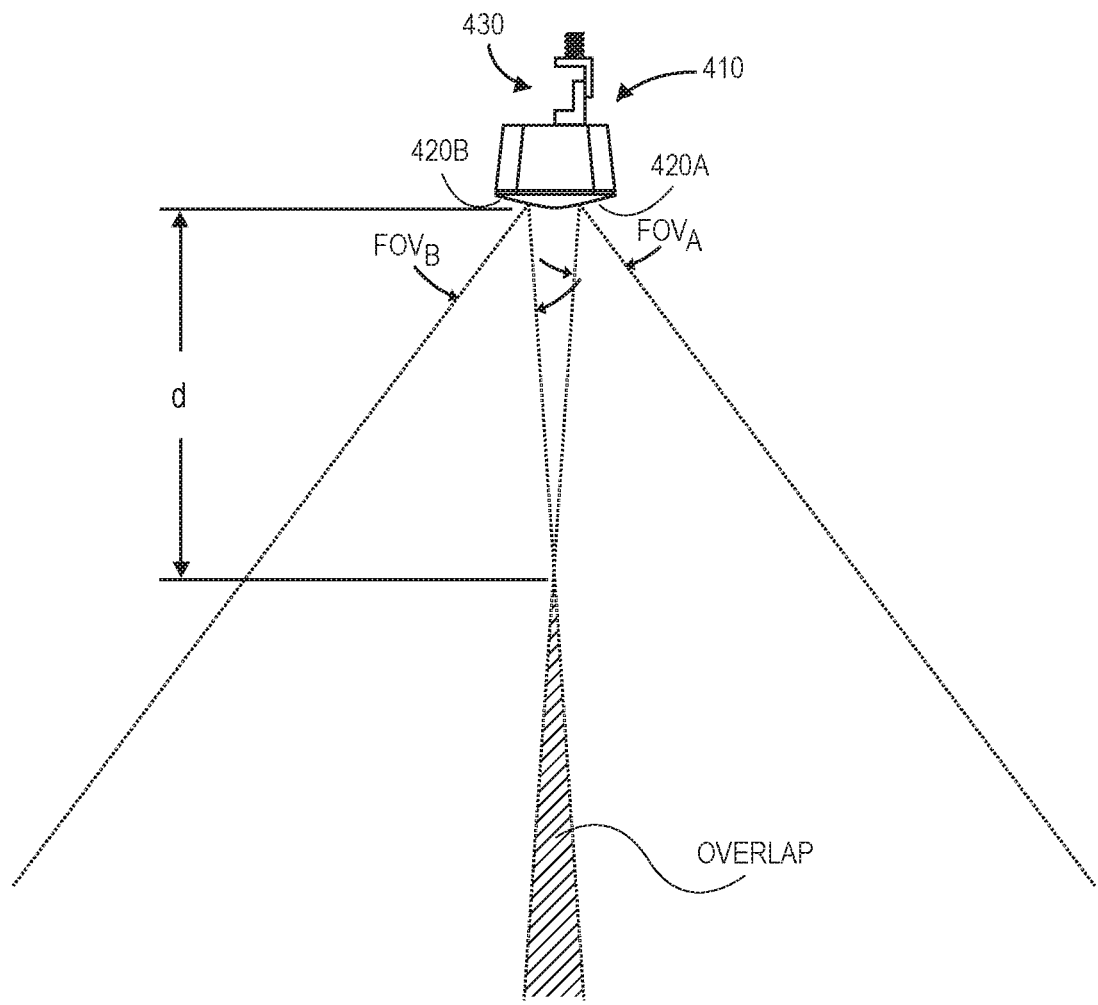

As is discussed above, some implementations of the dual camera module systems of the present disclosure are configured for mounting to ceilings or other elevated surfaces within retail establishments or other materials handling facilities, such that the dual camera module systems may capture imaging data using camera modules having axes of orientation that are normal to surfaces or panels of housings and have overlapping fields of view. Referring to FIGS. 4A and 4B, views of one dual camera module system in accordance with implementations of the present disclosure are shown. Except where otherwise noted, reference numerals preceded by the number "4" shown in FIGS. 4A and 4B indicate components or features that are similar to components or features having reference numerals preceded by the number "3" shown in FIGS. 3A through 3H, by the number "2" shown in FIGS. 2A and 2B or by the number "1" shown in FIGS. 1A through 1D.

As is shown in FIG. 4A, a dual camera module system 410 having an upper frame 412 and a lower frame 414 including a pair of camera modules 420A, 420B installed therein is coupled to a mount 430. The camera modules 420A, 420B are aligned with non-parallel axes of orientation extending normal to and away from angled lower surfaces or panels of the lower frame 414. As is also shown in FIG. 4A, the dual camera module system 410 is coupled to a mount 430 having a lower section 432 joined to a top surface or panel of the upper frame 412 and an upper section 434 configured for mounting to a ceiling or another surface, e.g., by a fastener 445 (e.g., a bolt, a screw, a rivet or any other fastener). The lower section 432 may be coupled to the upper section 434 in any manner, such as also by a bolt, a screw, a rivet or any other fastener (not shown). Alternatively, the dual camera module system 410 may be configured for mounting to a ceiling or another surface in any other manner, such as by one or more gaskets, springs, plates, brackets, ports, adapters, fittings or other systems, which may be selected on any basis, such as to enable connections to one or more power sources or networked components, or to reduce the effects of vibration on the operation of the camera modules 420A, 420B.

The dual camera module system 410 may be constructed, mounted and configured to optimize an extent of a retail establishment or other materials handling facility that is included within fields of view of the camera modules 420A, 420B. For example, as is shown in FIG. 4B, the fields of view $FOV_A$, $FOV_B$ of the camera modules 420A, 420B are aligned with non-parallel axes of orientation extending normal to and away from angled lower surfaces or panels of the dual camera module system 410. The angles at which the lower surfaces or panels of the dual camera module system 410 are provided and the height at which the dual camera module system 410 is mounted may be selected to ensure that the fields of view $FOV_A$, $FOV_B$ adequately cover areas beneath the dual camera module system 410 with sufficient clarity and resolution. For example, where the dual camera module system 410 is configured for mounting at higher elevations above a retail establishment or another materials handling facility, angles of lower surfaces or panels of the dual camera module system 410 from which the fields of view $FOV_A$, $FOV_B$ extend may be greater, with respect to horizontal, thereby causing the overlap between the fields of view $FOV_A$, $FOV_B$ to begin at a greater distance d from the dual camera module system 410, than where the dual camera module system 410 is to be mounted at lower elevations above the retail establishment or other materials handling facility.

In some implementations, the camera modules 420A, 420B may be installed or embedded within the dual camera module system 410 in a manner that causes the fields of view $FOV_A$, $FOV_B$ to overlap by approximately four degrees (4°), beginning at a distance d of approximately twelve inches below the dual camera module system 410. In such implementations, the overall field of view $FOV_{TOTAL}$ covered by the camera modules 420A, 420B is approximately one hundred twelve degrees (112°). In some implementations, the camera modules 420A, 420B may be installed or embedded within the dual camera module system 410 in a manner that causes the fields of view $FOV_A$, $FOV_B$ to overlap by approximately five degrees) (5°), beginning at a distance d of approximately ten inches below the dual camera module system 410. In such implementations, the overall field of view $FOV_{TOTAL}$ covered by the camera modules 420A, 420B is approximately one hundred six degrees (106°). In some implementations, the camera modules 420A, 420B may be installed or embedded within the dual camera module system 410 in a manner that causes the fields of view $FOV_A$, $FOV_B$ to overlap by approximately thirteen degrees (13°), beginning at a distance d of approximately three inches below the dual camera module system 410. In such implementations, the overall field of view $FOV_{TOTAL}$ covered by the camera modules 420A, 420B is approximately ninety-three degrees (93°).

As is discussed above, the dual camera module systems of the present disclosure may include imaging devices, power sources, network communications systems and other components that are mounted to boards and installed within housings that are configured for mounting to ceilings or other elevated surfaces, e.g., within a retail establishment or other materials handling facility.

Figure 5A:
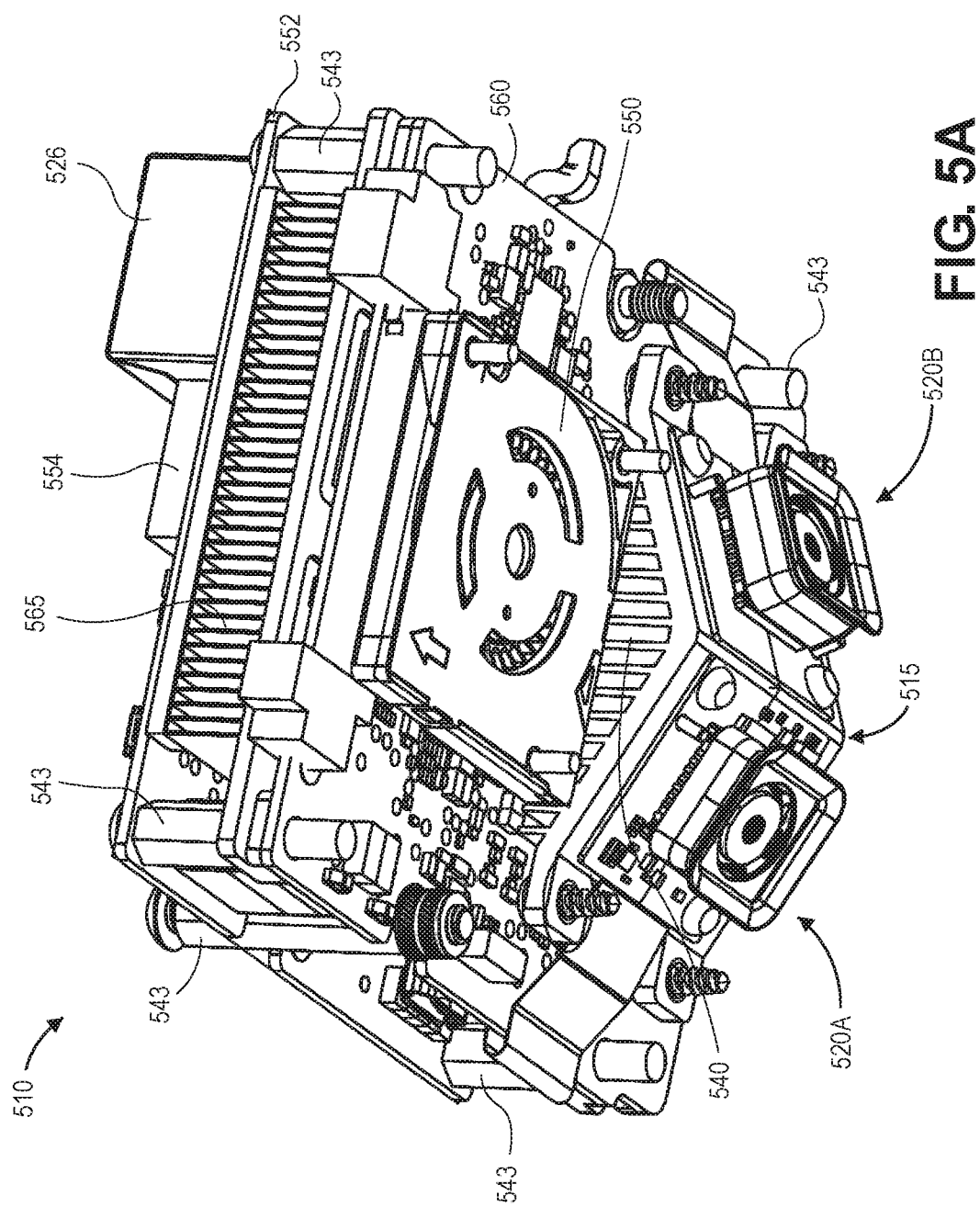
FIGS. 5A and 5B are views of aspects of one dual camera module system in accordance with implementations of the present disclosure.
Figure 5B:
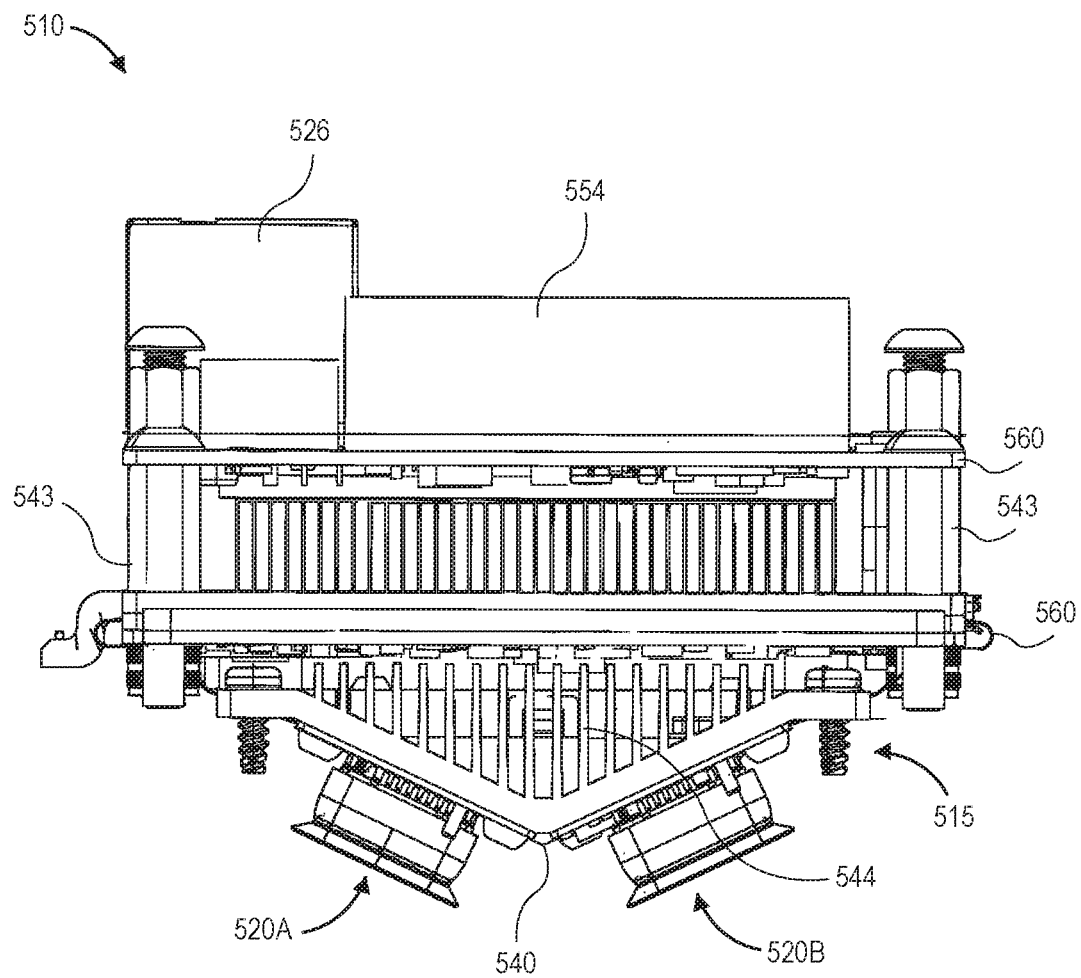

Referring to FIGS. 5A and 5B, views of one dual camera module system in accordance with implementations of the present disclosure are shown. Except where otherwise noted, reference numerals preceded by the number "5" shown in FIGS. 5A and 5B indicate components or features that are similar to components or features having reference numerals preceded by the number "4" shown in FIGS. 4A and 4B, by the number "3" shown in FIGS. 3A through 3H, by the number "2" shown in FIGS. 2A and 2B or by the number "1" shown in FIGS. 1A through 1D.

FIG. 5A is a bottom perspective view of internal components of a dual camera module system 510, shown without a housing. FIG. 5B is a side view of the internal components of the dual camera module system 510.

As is shown in FIGS. 5A and 5B, the dual camera module system 510 includes a camera assembly 515 and a pair of circuit boards 560. The camera assembly 515 includes a pair of camera modules 520A, 520B coupled to an optical bench 540.

The optical bench 540 includes a pair of planar sections (e.g., platforms) having a plurality of fins extending below such sections. The optical bench 540 is coupled to one of the circuit boards 560 by way of a plurality of standoffs, spacers or fasteners, e.g., bolts, screws, rivets or other components. The planar sections of the bench 540 have edges that are joined at an obtuse dihedral angle. The camera modules 520A, 520B are mounted to sides or surfaces of the planar sections that are external to the obtuse dihedral angle, e.g., to upper sides or surfaces of the planar sections, on either side of edges that form the obtuse dihedral angle. Axes of orientation of the camera modules 520A, 520B extend normal to and away from the upper sides or surfaces of the planar sections in a non-parallel, diverging fashion. Additionally, each of the fins is mounted to sides or surfaces of the planar sections that are internal to the obtuse dihedral angle, e.g., to lower sides or surfaces of the planar sections, on either side of edges that form the obtuse dihedral angle. The fins are aligned in parallel, and form a plurality of ducts therebetween, such that each of the plurality of ducts is defined by two of the plurality of fins. The fins mounted to the lower sides or surfaces of the planar sections thus act as a heat sink for the camera modules 520A, 520B mounted to the upper sides or surfaces of such sections, or for other components of the dual camera module system 510.

The circuit boards 560 may have any number of components, such as processors or memory or storage components, provided thereon. In some implementations, the circuit boards 560 and the camera modules 520A, 520B and/or the optical bench 540 may be electronically coupled to one another by one or more board-to-board connectors, such that the operation of the camera modules 520A, 520B may be powered, controlled or implemented by one or more processors coupled to the circuit board 560. As is shown in FIGS. 5A and 5B, one or both of the circuit boards 560 may include a network connection 526 (e.g., an Ethernet connector) and a power source 554, such as a battery, a transformer, a converter, or another system provided thereon.

The circuit boards 560 may be physically coupled to one another by one or more fasteners or other systems. For example, as is shown in FIGS. 5A and 5B, the circuit boards 560 are aligned in parallel and joined by a plurality of standoffs (or spacers) 543 to form a channel therebetween. Additionally, as is shown in FIGS. 5A and 5B, a heat sink 565 having a plurality of fins is mounted between the circuit boards 560, such that the fins extend vertically into the channel defined by the circuit boards 560.

Additionally, as is shown in FIGS. 5A and 5B, a blower 550 is mounted to one of the circuit boards 560. The blower 550 has an inlet that may be aligned to draw flows of air through the plurality of fins of the optical bench 540, e.g., from an inlet to a housing of the dual camera module system 510 (not shown), and an outlet aligned to discharge the flows of air across the plurality of fins of the heat sink 565, or ultimately to an outlet of a housing of the dual camera module system 510 (not shown).

The components that are provided within housings of dual camera module systems 510 may have any dimensions or shapes, e.g., dimensions or shapes corresponding to dimensions or shapes of cavities within housings of such modules. For example, where a housing of the dual camera module system 510 (not shown) has a width of approximately seventy-five millimeters, a length of approximately seventy-five millimeters, and a height of approximately sixty millimeters, the circuit boards 560 mounted within the housing may have a width of approximately sixty millimeters and a length of approximately sixty millimeters. Alternatively, the circuit boards 560 or any other components may have any dimensions or shapes with respect to the housings of the dual camera module systems 510 in accordance with implementations of the present disclosure.

Alternatively, as is discussed above, a dual camera module system of the present disclosure may be operated without a housing. For example, one or more components of the dual camera module system 510 shown in FIG. 5A or 5B (e.g., one or more of the circuit boards 560) may be used to mount the dual camera module system 510 to a ceiling or another surface, and a housing need not be provided.

As is discussed above, an optical bench may be formed by coupling a pair of camera modules to upper sides or surfaces of planar sections of a bench or other system that are aligned at obtuse dihedral angles with respect to one another. In some implementations, the bench may further include a plurality of fins mounted to lower sides or surfaces of the planar sections of the bench that are aligned in parallel to one another, and define a heat sink having a plurality of ducts extending through such fins. Referring to FIGS. 6A through 6F, views of one dual camera module system in accordance with implementations of the present disclosure are shown. Except where otherwise noted, reference numerals preceded by the number "6" shown in FIGS. 6A through 6F indicate components or features that are similar to components or features having reference numerals preceded by the number "5" shown in FIGS. 5A and 5B, by the number "4" shown in FIGS. 4A and 4B, by the number "3" shown in FIGS. 3A through 3H, by the number "2" shown in FIGS. 2A and 2B or by the number "1" shown in FIGS. 1A through 1D.

Figure 6A:
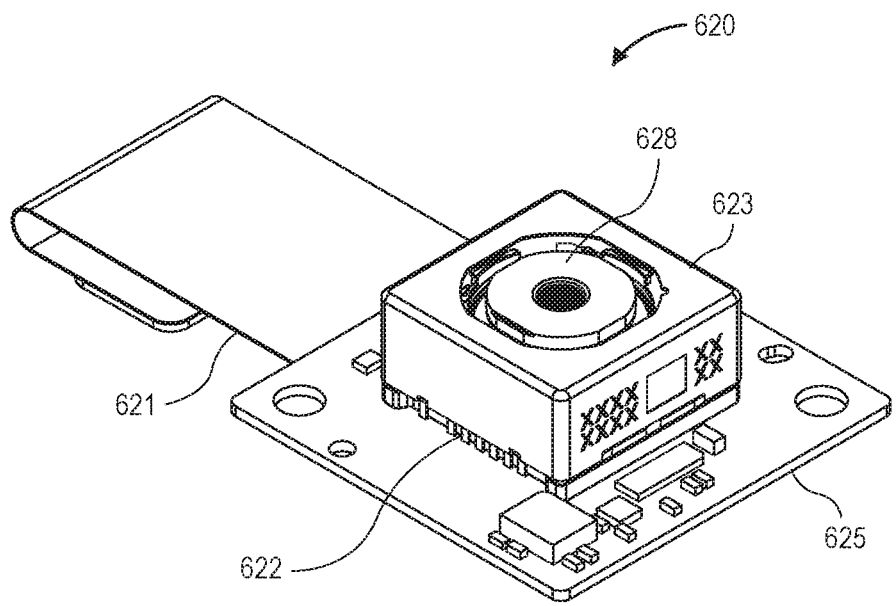
FIGS. 6A through 6F are views of aspects of one dual camera module system in accordance with implementations of the present disclosure.
Figure 6B:
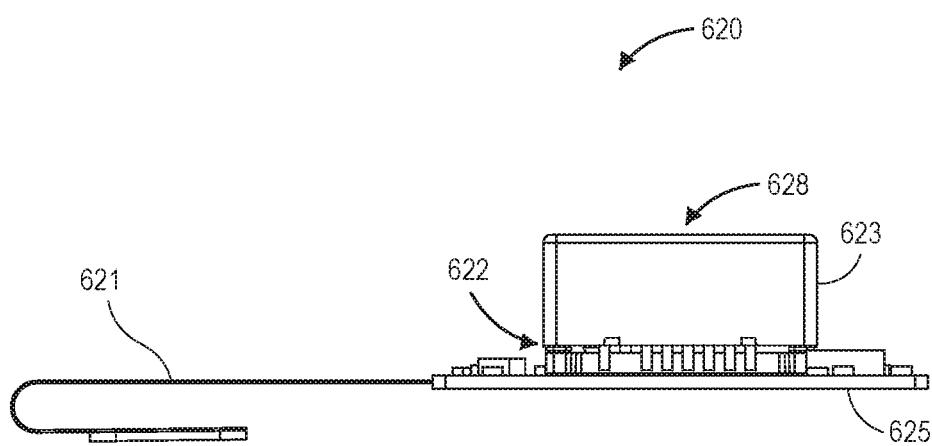

As is shown in FIGS. 6A and 6B, a camera module 620 of the present disclosure includes a camera sensor 622, a stabilization module 623, a substrate 625 and a lens 628. The camera sensors 622 may include one or more arrays of photodetectors or photosensitive components such as CCD sensors, CMOS sensors, photodiodes, or other sensors that are provided within a housing and configured to capture light reflected from objects and assign one or more quantitative values (e.g., red, green, blue or other color values, or distances or ranges) to aspects of the reflected light. The camera sensor 622 may be configured to capture any imaging data, such as visual imaging data or depth imaging data at any levels of resolution or frame rates. The stabilization module 623 may be a housing or other component having one or more internal springs or other systems for compensating for any motion of the camera sensor 622, or any vibration affecting the camera sensor 622. Alternatively, in some implementations, the camera module 620 need not include a stabilization module or the respective components thereof. Additionally, the substrate 625 may be or include a circuit board or other like system for mounting or framing the camera sensor 622 with respect to the lens 628. In some implementations, the substrate 625 may include one or more bores or other openings for coupling the camera module 620 to a bench or other system by one or more fasteners or other connectors.

Additionally, as is further shown in FIGS. 6A and 6B, the camera module 620 further includes a connector 621 or other component for electrically coupling the camera module 620 to a power source, a processor, or one or more other components. The connector 621 may be formed from a single piece of conductive material (e.g., aluminum or copper, or others), that is suitably durable and may be folded or bent to connect with one or more components of a dual camera module system, e.g., one or more circuit boards or other systems. For example, as is shown in FIGS. 6A and 6B, the connector 621 includes an end that is foldable or bendable to angles of approximately one hundred eighty degrees (180°) or more, e.g., in an opposite direction.

Figure 6C:
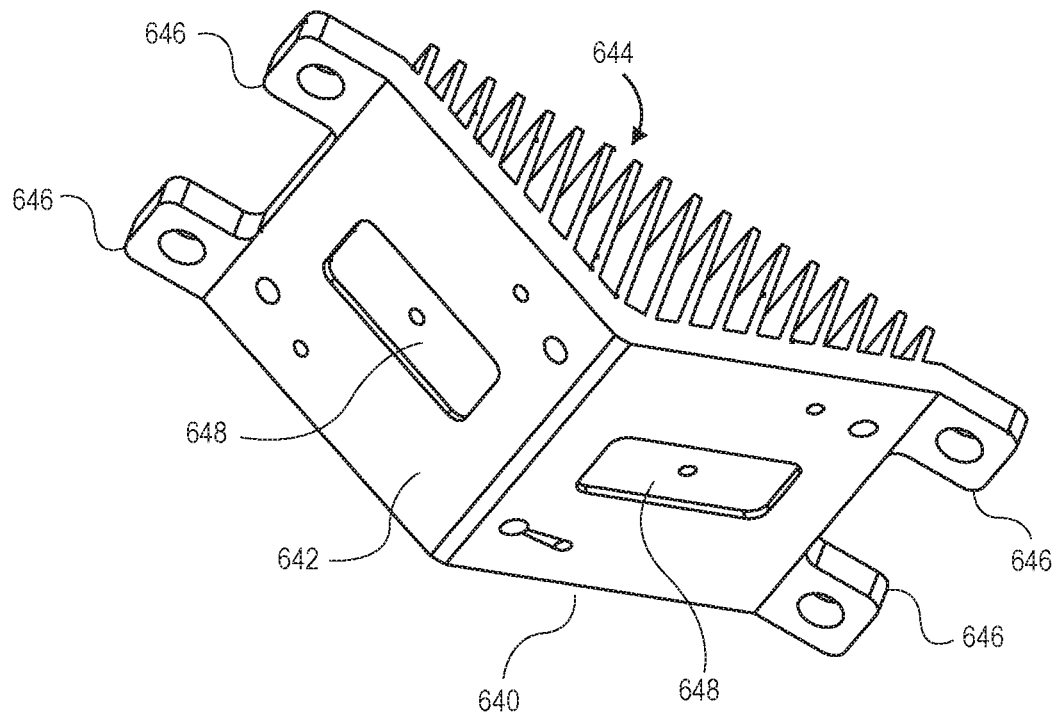
Figure 6D:
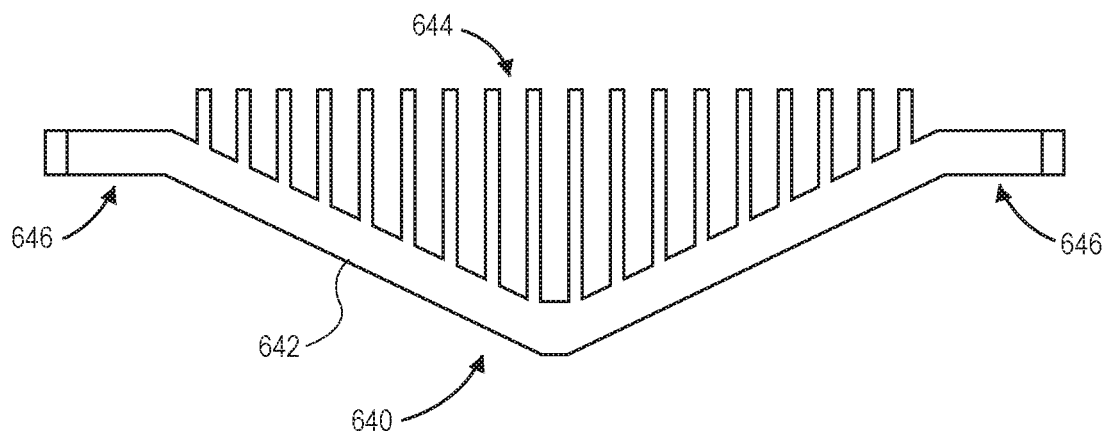

As is shown in FIGS. 6C and 6D, an optical bench 640 comprises a platform 642, a plurality of fins 644 and a plurality of mounting extensions 646. The platform 642 comprises a pair of planar sections that are joined at edges to form an obtuse dihedral angle. Each of the plurality of fins 644 extends from an interior side or surface of one of the planar sections of the platform 642 in parallel, e.g., within an interior of the obtuse dihedral angle defined by the platform 642. The fins 644 of the optical bench 640 that are provided along the interior side or surface of the platform 642, and ducts between pairs of the fins 644, act as a heat sink for the camera modules 620 mounted to the exterior sides or surfaces of the platform 642.

Each of the mounting extensions 646 extends laterally from one of the corners of the platform 642, within a common plane, and includes a bore or other opening for coupling the optical bench 640 to a circuit board or other system, or to a frame or chassis of a housing, by one or more fasteners or other connectors. Alternatively, in some implementations, the optical bench 640 may be coupled to a circuit board or other system, or to a frame or chassis, in any other manner (e.g., one or more adhesives).

Additionally, an exterior side or surface of the platform 642 includes a pair of depressions 648, one on upper sides or surfaces of each of the planar sections. The exterior side or surface of the platform 642 may further include bores or other openings for coupling the optical bench 640 to one or more camera modules by one or more fasteners or other connectors. In some implementations, aspects of the optical bench 640 including but not limited to the platform 642, the plurality of fins 644 and the mounting extensions 646 may be formed from an extruded aluminum, e.g., an aluminum alloy such as aluminum-6063. Alternatively, in some other implementations, one or more aspects of the optical bench 640 may be formed from any other materials, including not only metals but also plastics or composites.

Figure 6E:
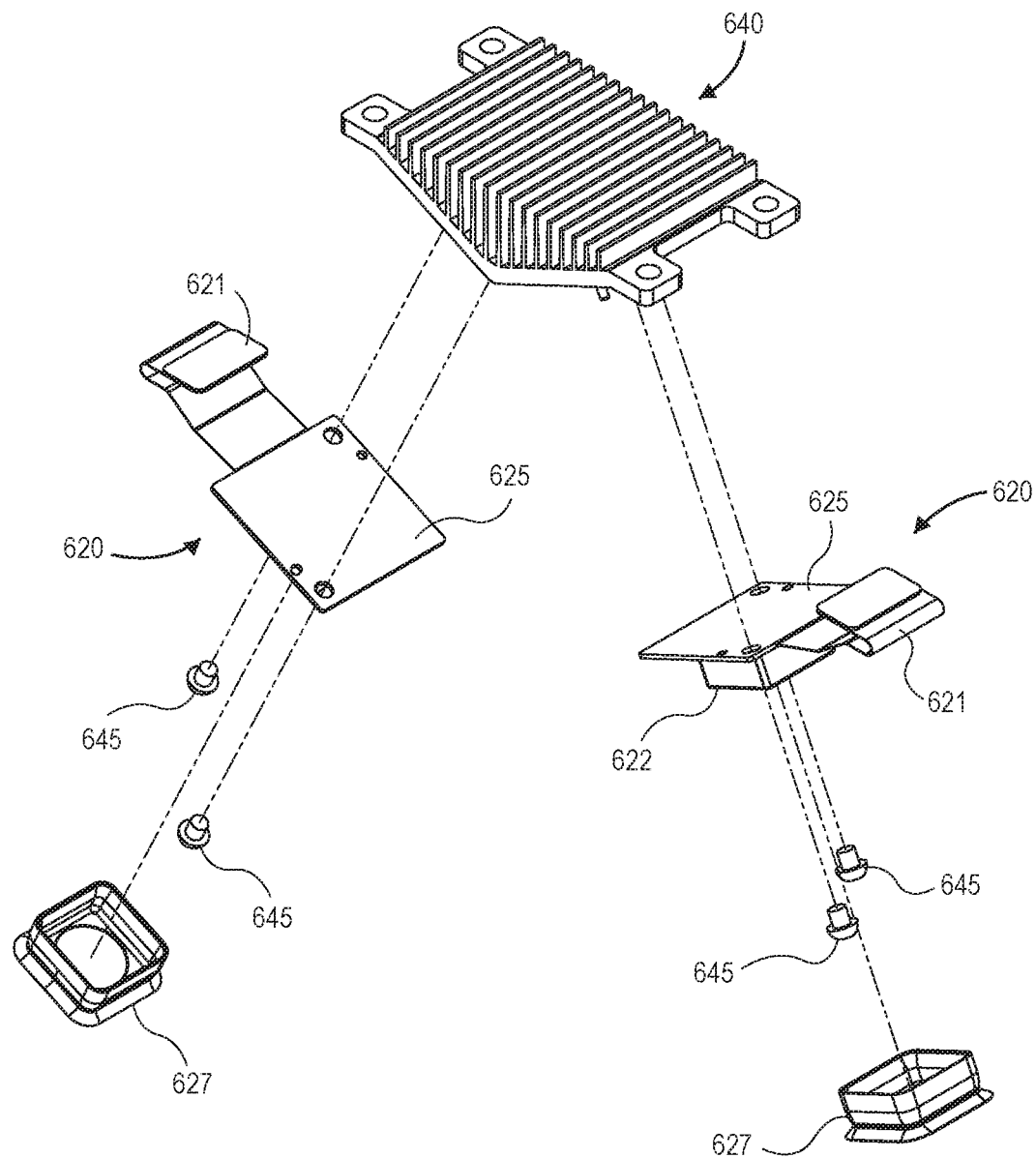
Figure 6F:
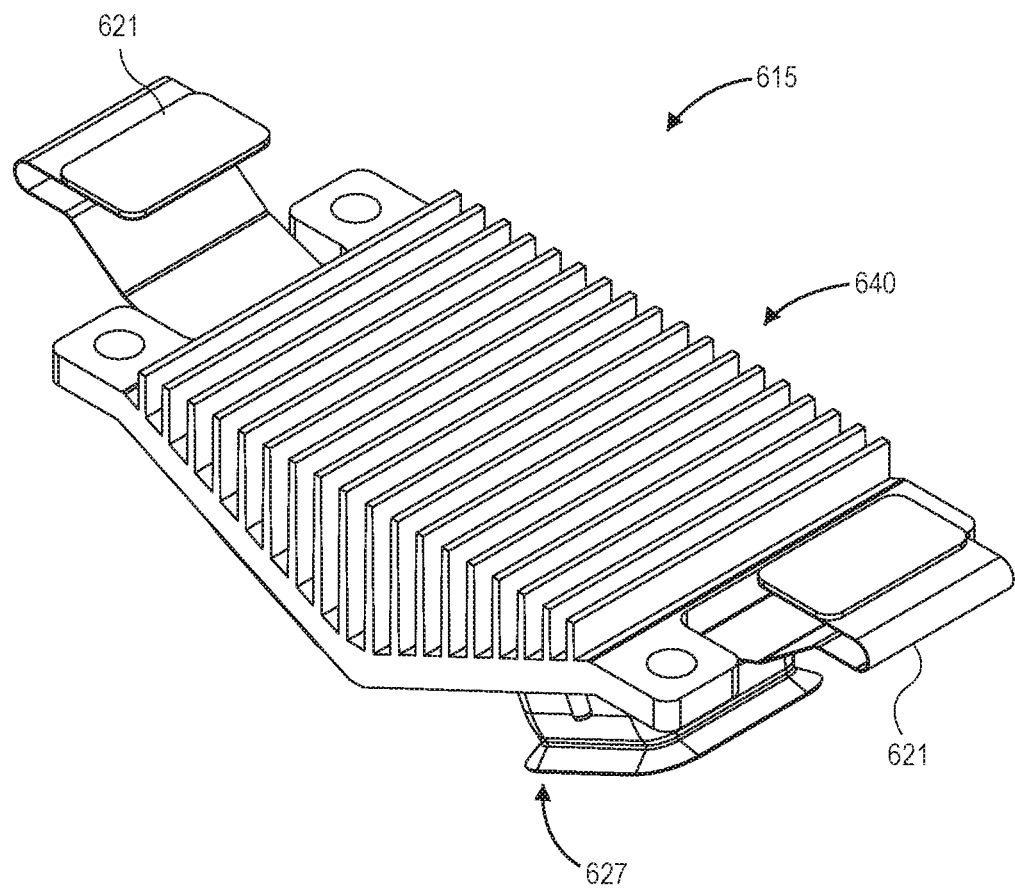

As is shown in FIGS. 6E and 6F, in accordance with implementations of the present disclosure, a camera assembly 615 may be formed by coupling a pair of the camera modules 620 shown in FIGS. 6A and 6B to the exterior sides or surfaces of the planar sections of the platform 642, e.g., one camera module 620 to each of such planar sections, shown in FIGS. 6C and 6D. For example, as is shown in FIG. 6E, the camera modules 620 may be mounted to the platform 642 such that their respective camera sensors 622 have non-parallel axes of orientation extending normal to and away from the exterior sides or surfaces of the platform 642. A predetermined amount or volume of putty, glue, adhesive, epoxy or other substances may be placed in the depressions 648 in the platform 642, prior to coupling the camera modules 620 thereto. Additionally, the substrates 625 of the respective camera modules 620 may be joined to the platform 642 by a plurality of fasteners 645, which may be extended through bores or other openings in the substrates 625 and into threaded openings in upper sides or surfaces of the platform 642. Such bores or openings may be pre-cut or pre-formed therein, or formed by the fasteners 645. Moreover, in some implementations, seals 627 or other barriers may be applied to each of the stabilization modules 623, in order to protect the camera sensor 622 or the lens 628 from any dust, debris, stray light or other conditions that may be adverse to their operation.

As is shown in FIG. 6F, the camera assembly 615 is formed upon coupling the camera modules 620 to the optical bench 640.

Figure 7B:
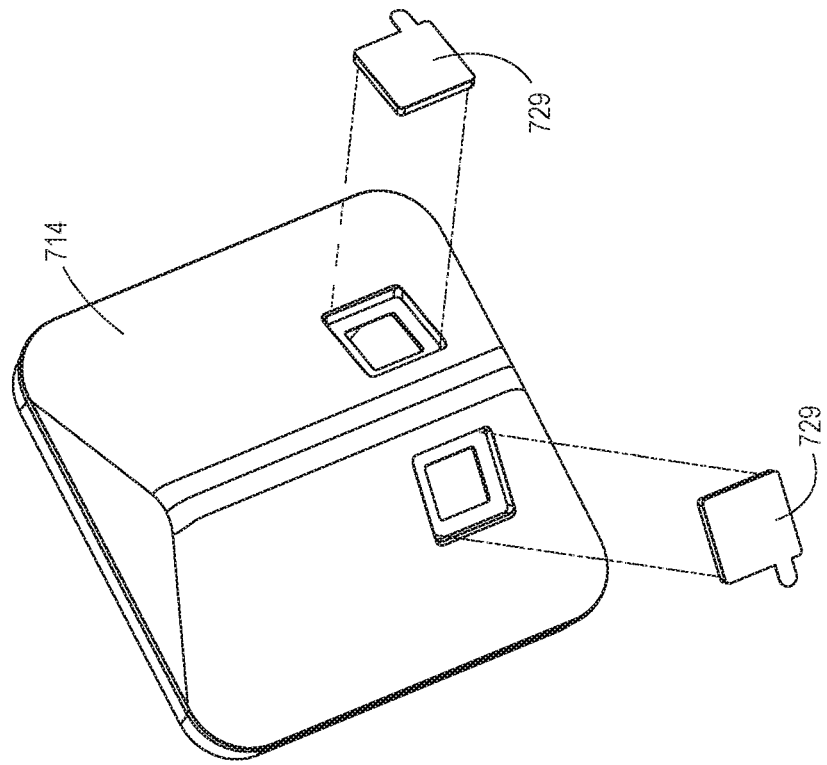
FIGS. 7A through 7C are views of aspects of one dual camera module system in accordance with implementations of the present disclosure.
Figure 7A:
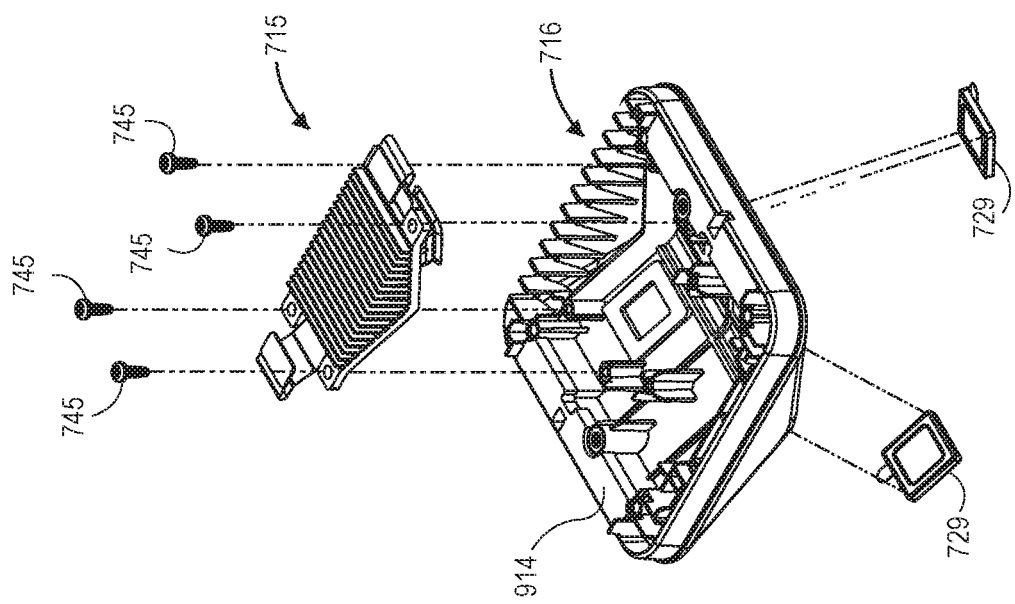
Figure 7C:
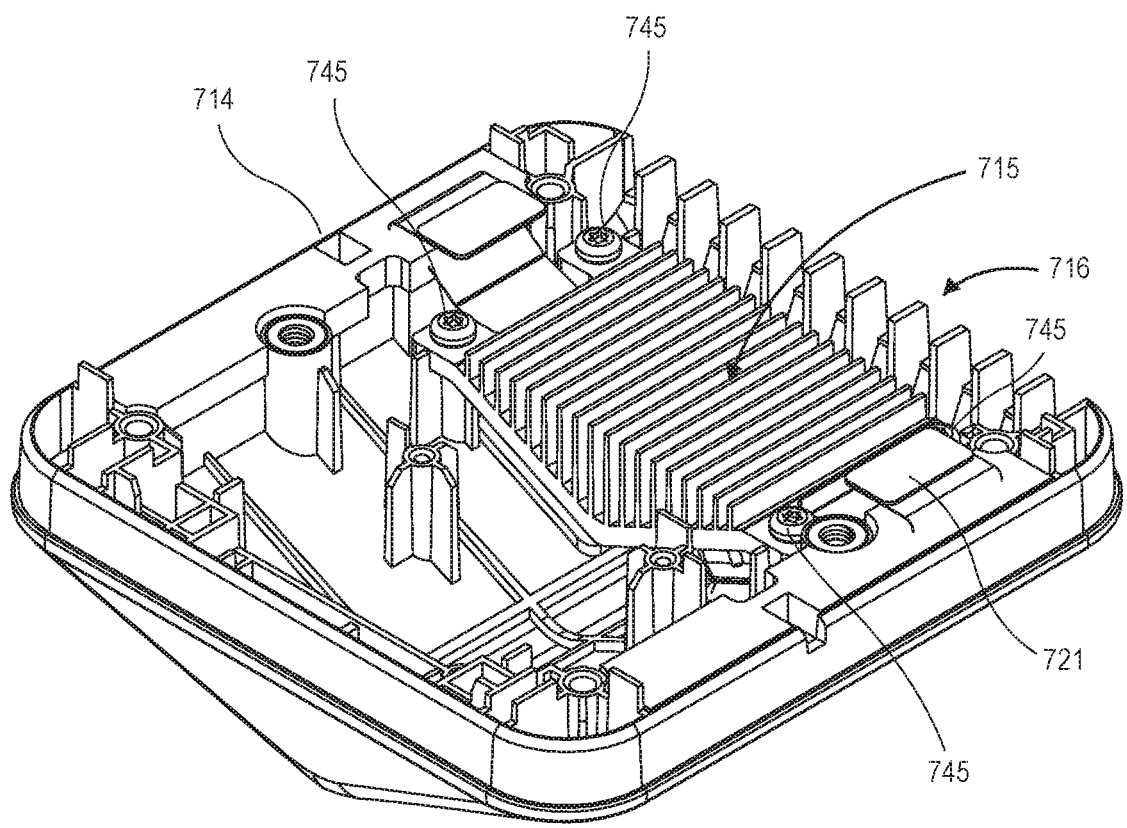

A camera assembly, such as the camera assembly 615 of FIG. 6F, may be joined to one or more frames or components of a housing in order to assemble a dual camera module system. Referring to FIGS. 7A through 7C, views of aspects of one dual camera module system in accordance with implementations of the present disclosure are shown. Except where otherwise noted, reference numerals preceded by the number "7" shown in FIGS. 7A through 7C indicate components or features that are similar to components or features having reference numerals preceded by the number "6" shown in FIGS. 6A through 6F, by the number "5" shown in FIGS. 5A and 5B, by the number "4" shown in FIGS. 4A and 4B, by the number "3" shown in FIGS. 3A through 3H, by the number "2" shown in FIGS. 2A and 2B or by the number "1" shown in FIGS. 1A through 1D.

As is shown in FIG. 7A, a lower frame 714 may be formed from one or more plastics (e.g., polycarbonates or combinations of polycarbonates and other materials, such as ABS), composites, woods, metals or other materials. The lower frame 714 may define a cavity having an upper perimeter having a substantially square shape or cross-section, and a pair of angled, planar sections descending therefrom. Additionally, the lower frame 714 further includes an air flow inlet 716 on one side of the upper perimeter.

The lower frame 714 of FIGS. 7A and 7B is configured to receive one or more components of a dual camera module system therein. For example, as is shown in FIG. 7A, a camera assembly 715, which may have one or more attributes or features in common with the camera assembly 615 of FIG. 6F, may be inserted into the cavity and mounted therein by a plurality of fasteners 745. The camera assembly 715 may include an optical bench 740 and a pair of camera modules mounted thereto. The fasteners 715 may extend through bores or other openings in the optical bench 740 and be inserted into openings within inner panels or surfaces of the lower frame 714. Such openings may be threaded openings that are pre-cut or pre-formed within the lower frame 714, or formed within the lower frame 714 by the fasteners 745.

The lower frame 714 may further include holes or other openings aligned with lenses or lens frames of the camera assembly 715. Additionally, as is shown in FIG. 7B, windows 729 (or shields) may be applied to such holes or openings in the lower frame 714, and may be entirely or partially transparent or translucent.

As is also shown in FIGS. 7A and 7B, the planar sections of the lower frame 714 may define an obtuse dihedral angle, such that fields of view of the camera modules 720 passing through the holes or openings and the windows 729 have non-parallel axes of orientation extending normal to and away from the planar sections. In some implementations, such as is shown in FIGS. 7A and 7B, the obtuse dihedral angle formed by the planar sections of the lower frame 714 is substantially similar or equal to an obtuse dihedral angle formed by the sides or surfaces of the bench 740 to which the camera modules 720 are joined.

As is shown in FIG. 7C, the camera assembly 715 is installed within the cavity of the lower frame 714, such that the fins and/or ducts of the optical bench 740 are laterally co-aligned with the air flow inlet 716.

Figure 8A:
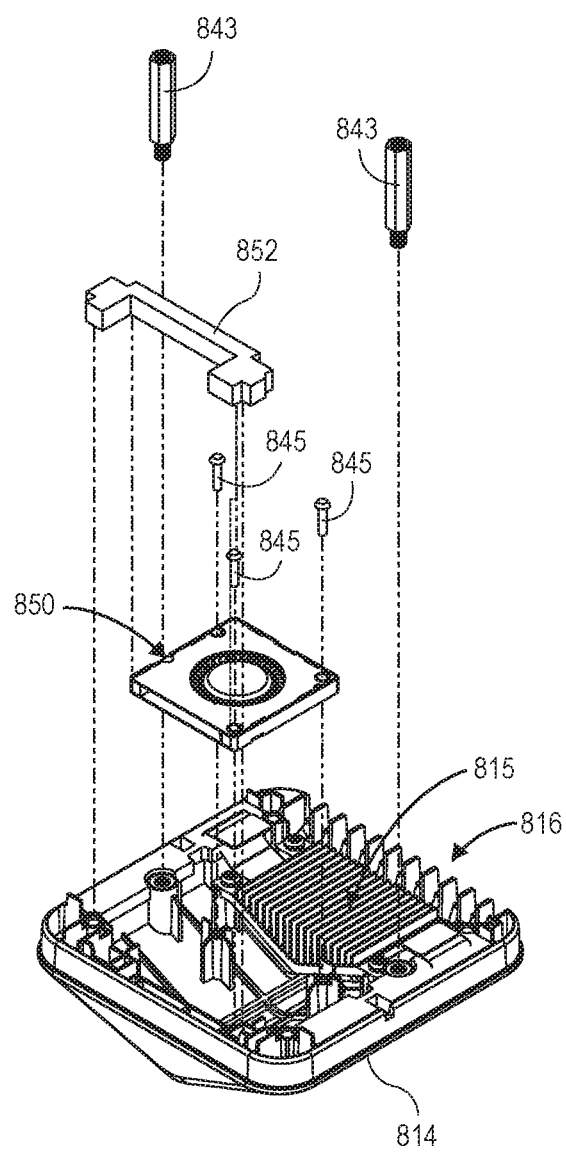
FIGS. 8A and 8B are views of aspects of one dual camera module system in accordance with implementations of the present disclosure.
Figure 8B:
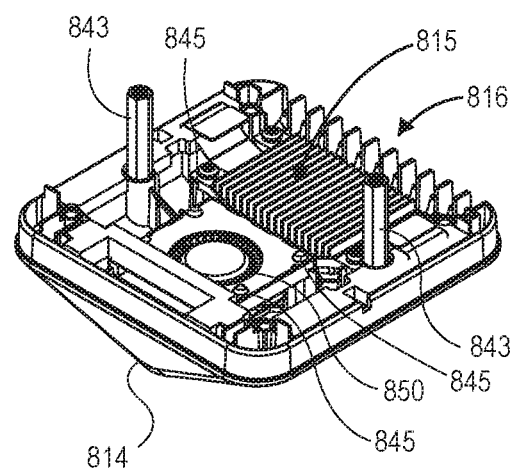

As is discussed above, the dual camera module systems of the present disclosure may be equipped with fans, blowers or other systems for circulating air therethrough. Referring to FIGS. 8A and 8B, views of aspects of one dual camera module system in accordance with implementations of the present disclosure are shown. Except where otherwise noted, reference numerals preceded by the number "8" shown in FIGS. 8A and 8B indicate components or features that are similar to components or features having reference numerals preceded by the number "7" shown in FIGS. 7A through 7C, by the number "6" shown in FIGS. 6A through 6F, by the number "5" shown in FIGS. 5A and 5B, by the number "4" shown in FIGS. 4A and 4B, by the number "3" shown in FIGS. 3A through 3H, by the number "2" shown in FIGS. 2A and 2B or by the number "1" shown in FIGS. 1A through 1D.

As is shown in FIG. 8A, a blower 850 (or fan) may be mounted into a cavity defined by a lower frame 814 by a plurality of fasteners 845. The blower 850 may be mounted adjacent to a camera assembly 815, and laterally aligned to draw air through an air flow inlet 816 in the lower frame 814, along fins and through ducts provided in the camera assembly 815, in a substantially horizontal direction. Additionally, a plurality of standoffs (or spacers) 843 may be further installed within the cavity defined by the lower frame 814, and a gasket 852 may be applied within a vicinity of an outlet of the blower 850, to redirect air expelled by the blower 850 in a vertical direction. The lower frame 814 and/or the camera assembly 815 may have one or more attributes or features in common with the lower frame 714 and/or the camera assembly 715 of FIGS. 7A through 7C. The blower 850 (or fan) may include blades or other impellers that are aligned at any direction with respect to an axis of rotation.

As is also discussed above, the dual camera module systems of the present disclosure may include one or more circuit boards (e.g., printed circuit board assemblies) having any number of processors, power sources or other components coupled thereto. The circuit boards may be installed within a housing or other structure in a manner that defines one or more channels of a flow path within the housing. Referring to FIGS. 9A and 9B, views of aspects of one dual camera module system in accordance with implementations of the present disclosure are shown. Except where otherwise noted, reference numerals preceded by the number "9" shown in FIGS. 9A and 9B indicate components or features that are similar to components or features having reference numerals preceded by the number "8" shown in FIGS. 8A and 8B, by the number "7" shown in FIGS. 7A through 7C, by the number "6" shown in FIGS. 6A through 6F, by the number "5" shown in FIGS. 5A and 5B, by the number "4" shown in FIGS. 4A and 4B, by the number "3" shown in FIGS. 3A through 3H, by the number "2" shown in FIGS. 2A and 2B or by the number "1" shown in FIGS. 1A through 1D.

As is shown in FIG. 9A, a lower frame 914 includes a camera assembly 915 and a blower 950 (or fan) mounted within a cavity. The lower frame 914 further includes an air flow inlet 916, and the blower 950 is laterally aligned to draw air through the air flow inlet 916, along fins and through ducts provided in the camera assembly 915, in a substantially horizontal direction. The lower frame 914 also includes a gasket 952 applied within a vicinity of an outlet of the blower 950, to redirect air expelled by the blower 950 in a vertical direction. Additionally, a pair of standoffs 943 (or spacers) are mounted in a lower side or surface of the lower frame 914 and extend vertically upward therefrom. The lower frame 914 and/or the camera assembly 915 may have one or more attributes or features in common with the lower frame 814 and/or the camera assembly 815 of FIGS. 8A and 8B.

As is also shown in FIG. 9A, a circuit board 960 having a plurality of processors 924 or other components joined thereto may be placed into the lower frame 914 and applied over components within the lower frame 914, including but not limited to the camera assembly 915 and the blower 950.

As is also shown in FIG. 9A, the circuit board 960 includes a pair of openings or cut-outs that enable the circuit board 960 to be placed within the lower frame 914 without contacting or adversely affecting the standoffs 943.

With the circuit board 960 applied over the components within the lower frame 914, as is shown in FIG. 9B, the circuit board 960 acts as an upper bound or barrier of a portion of a flow path defined from the inlet 916 through the fins and ducts of the camera assembly 915 and the fan 950. Additionally, a gasket 952 applied to an end of the circuit board 960 acts as a cover or seal to the inlet 916, and isolates the inlet 916 from portions of the cavity of the lower frame provided above the circuit board 960.

Figures 10A, 10B:
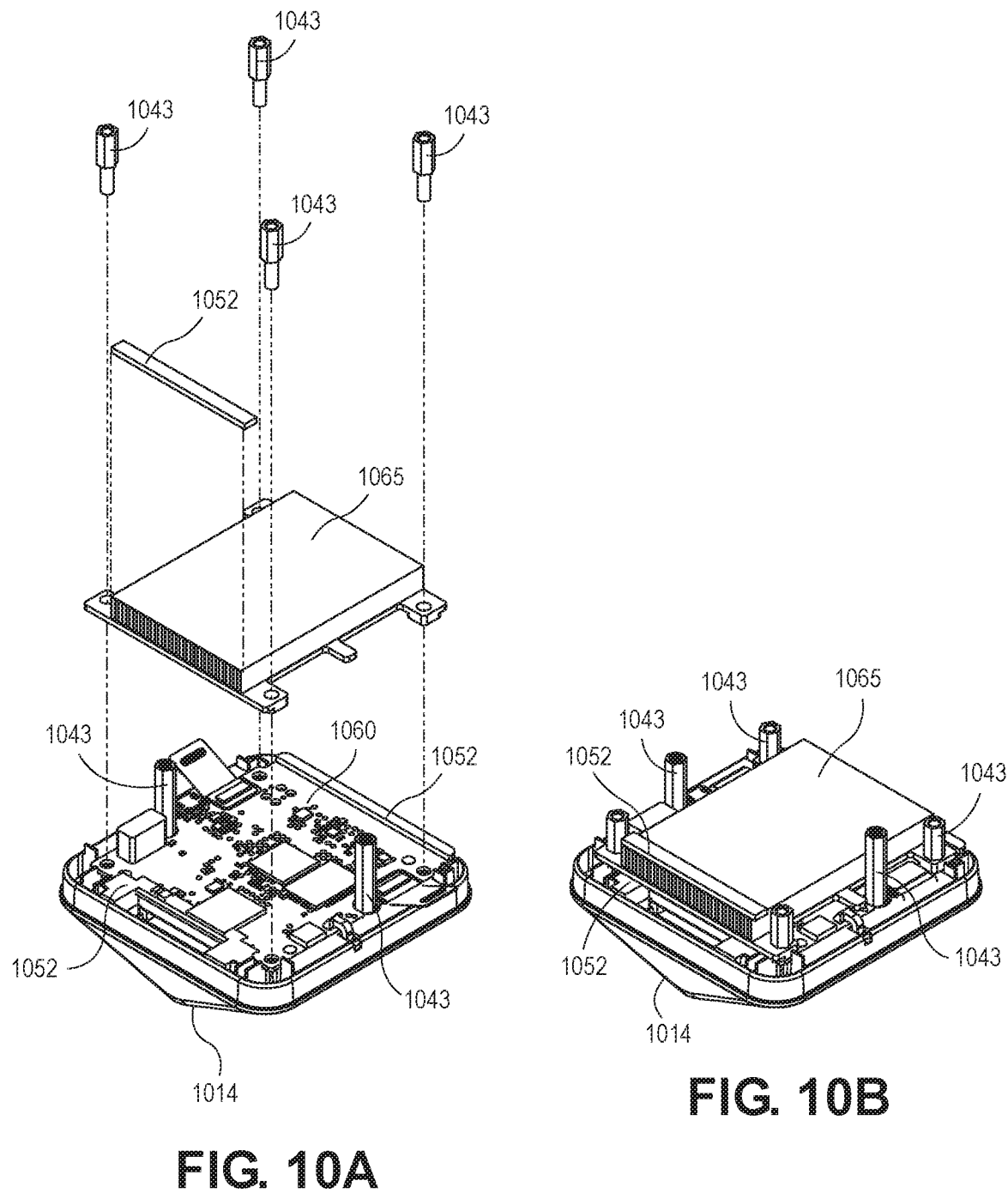
FIGS. 10A and 10B are views of aspects of one dual camera module system in accordance with implementations of the present disclosure.

As is also discussed above, the dual camera modules of the present disclosure may include one or more heat sinks mounted within their housings. Referring to FIGS. 10A and 10B, views of aspects of one dual camera module system in accordance with implementations of the present disclosure are shown. Except where otherwise noted, reference numerals preceded by the number "10" shown in FIGS. 10A and 10B indicate components or features that are similar to components or features having reference numerals preceded by the number "9" shown in FIGS. 9A and 9B, by the number "8" shown in FIGS. 8A and 8B, by the number "7" shown in FIGS. 7A through 7C, by the number "6" shown in FIGS. 6A through 6F, by the number "5" shown in FIGS. 5A and 5B, by the number "4" shown in FIGS. 4A and 4B, by the number "3" shown in FIGS. 3A through 3H, by the number "2" shown in FIGS. 2A and 2B or by the number "1" shown in FIGS. 1A through 1D.

As is shown in FIG. 10A, a lower frame 1014 includes a circuit board 1060 applied over an optical bench and a fan or blower (not shown) mounted within a cavity. A heat sink 1065 comprising a pair of planar panels or surfaces aligned in parallel and a plurality of fins provided therebetween, e.g., perpendicular to such panels or surfaces, is aligned to be applied over the circuit board 1060. The heat sink 1065 is installed within the cavity of the lower frame 1014 by a plurality of standoffs 1043 (or spacers), which may include fastening ends (e.g., threaded fastening ends) that extend through coaligned holes of the heat sink 1065 and within the circuit board 1060, and into one or more holes or other openings within the lower frame 1014. The heat sink 1065 is constructed such that standoffs 1043 (or spacers) that were previously installed into the lower frame 1014 may pass alongside and above the heat sink 1065, without contacting or adversely affecting such standoffs 1043. The lower frame 1014 or the circuit board 1060 may have one or more attributes or features in common with the lower frame 914 or the circuit board 960 of FIGS. 9A and 9B.

The heat sink 1065 of FIGS. 10A and 10B is aligned to form at least a portion of a flow path, e.g., along fins and through ducts provided in the heat sink 1065, in a substantially horizontal direction. In some implementations, one side of the heat sink 1065 may directly contact the circuit board 1060 or one or more components thereon. In some other implementations, however, the heat sink 1065 may be mounted to the lower frame 1014 in a manner that maintains a predetermined distance or separation between the heat sink 1065 and the circuit board 1060 or the one or more components thereon.

Any number of circuit boards may be installed within housings of dual camera module systems in accordance with the present disclosure. Referring to FIGS. 11A and 11B, views of aspects of one dual camera module system in accordance with implementations of the present disclosure are shown. Except where otherwise noted, reference numerals preceded by the number "11" shown in FIGS. 11A and 11B indicate components or features that are similar to components or features having reference numerals preceded by the number "10" shown in FIGS. 10A and 10B, by the number "9" shown in FIGS. 9A and 9B, by the number "8" shown in FIGS. 8A and 8B, by the number "7" shown in FIGS. 7A through 7C, by the number "6" shown in FIGS. 6A through 6F, by the number "5" shown in FIGS. 5A and 5B, by the number "4" shown in FIGS. 4A and 4B, by the number "3" shown in FIGS. 3A through 3H, by the number "2" shown in FIGS. 2A and 2B or by the number "1" shown in FIGS. 1A through 1D.

As is shown in FIG. 11A, a lower frame 1114 includes a heat sink 1165 mounted above a circuit board, an optical bench and a fan (not shown in FIGS. 11A and 11B) within a cavity. The heat sink 1165 comprises a pair of planar panels or surfaces aligned in parallel and a plurality of fins extending perpendicular therebetween. The heat sink 1165 is aligned to be applied over the circuit board 1160. Additionally, a plurality of standoffs 1143 (or spacers) mounted within the cavity of the lower frame 1114 extend above and beyond the heat sink 1165. The lower frame 1114 and the heat sink 1165 may have one or more attributes or features in common with the lower frame 1014 or the heat sink 1065 of FIGS. 10A and 10B.

As is shown in FIG. 11A, a circuit board 1160 having at least a network connection 1126 (e.g., a transceiver and/or Ethernet connector) and one or more power components 1154 mounted thereto may be installed within the cavity of the lower frame 1114 by a plurality of fasteners 1145, which may be inserted into some of the standoffs 1143 (or spacers) that are mounted within the cavity of the lower frame 1114. In some implementations, the power components 1154 may include one or more batteries (or fuel cells, or other power sources), capacitors, resistors, inductors, transistors or other components. For example, in some implementations, the power components 1154 may include one or more transformers or converters for receiving power from an external power source, and converting the power to a form that may be readily utilized by components of a dual camera module system, e.g., camera modules, blowers or fans, or the like. In some implementations, the power components 1154 may receive power via the network connection 1126, e.g., according to a PoE system or standard, or from any other external connection.

Additionally, as is shown in FIG. 11B, with the circuit board 1160 installed over the heat sink 1165 within the cavity of the lower frame 1114, the heat sink 1165 may remove heat generated by the network connection 1126 or the power source 1154, or by any other components that are coupled to the circuit board 1160. Furthermore, as is also shown in FIG. 11B, two of the standoffs 1143 extend above and beyond the circuit board 1160 with the circuit board 1160 installed within the cavity of the lower frame 1114.

Figure 12A:
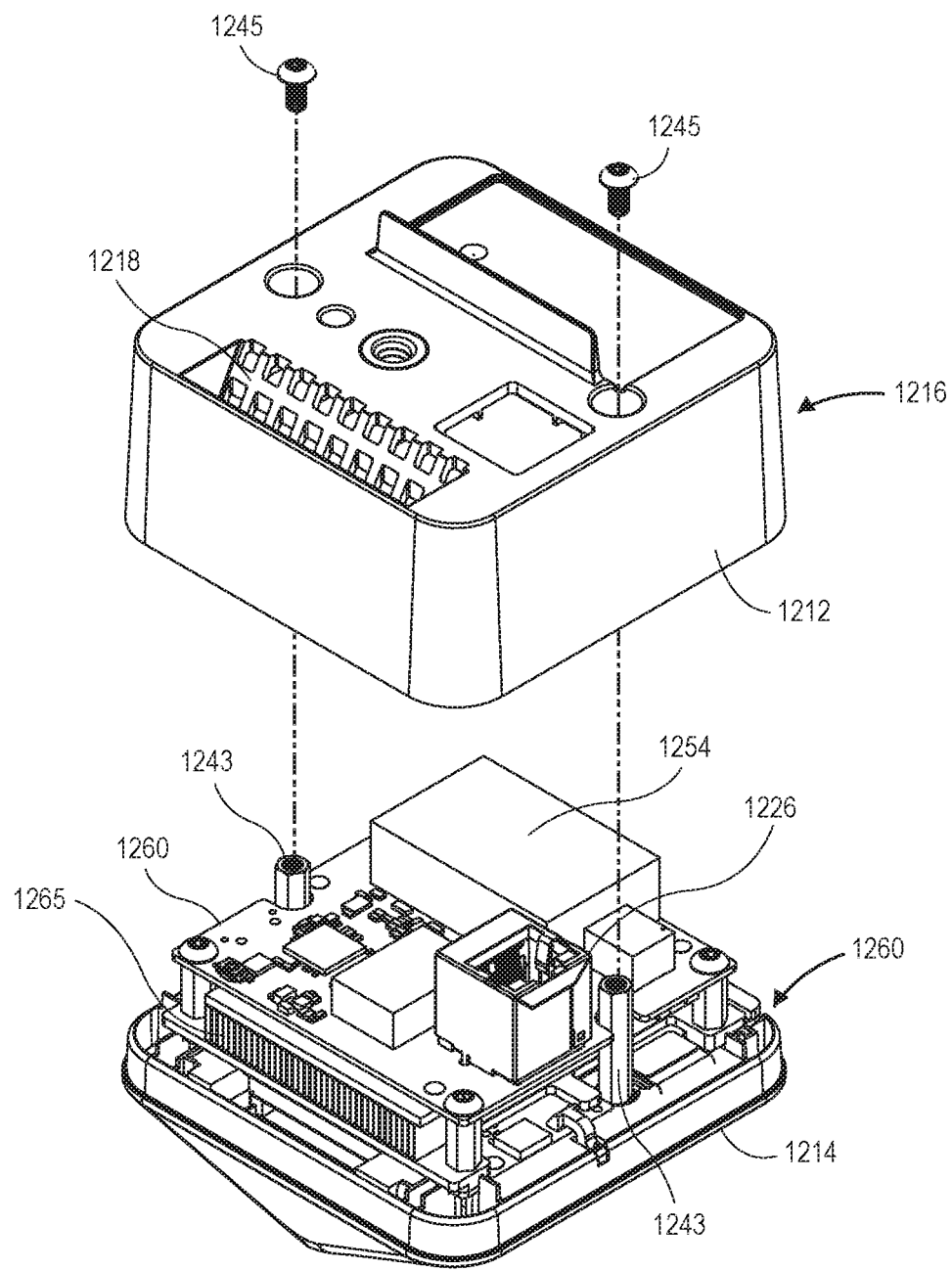
FIGS. 12A and 12B are views of aspects of one dual camera module system in accordance with implementations of the present disclosure.
Figure 12B:
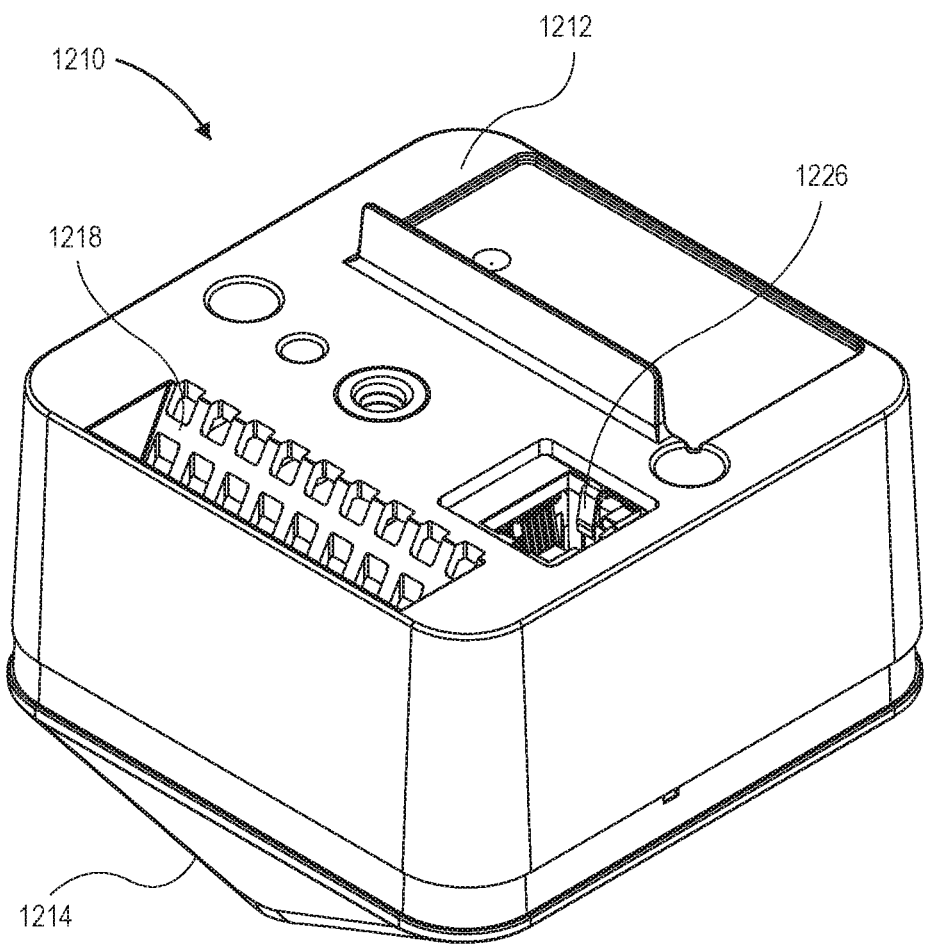

A housing including various internal components of a dual camera module system may be defined by two or more frames, e.g., an upper frame and a lower frame, which may be joined together to define a cavity and one or more flow paths extending through the housing. For example, one of the frames of the housing may act as a chassis for supporting one or more of the internal components of the dual camera module system, and another of the frames may act as a cover, a case, a shroud or another system. Referring to FIGS. 12A and 12B, views of aspects of one dual camera module system in accordance with implementations of the present disclosure are shown. Except where otherwise noted, reference numerals preceded by the number "12" shown in FIGS. 12A and 12B indicate components or features that are similar to components or features having reference numerals preceded by the number "11" shown in FIGS. 11A and 11B, by the number "10" shown in FIGS. 10A and 10B, by the number "9" shown in FIGS. 9A and 9B, by the number "8" shown in FIGS. 8A and 8B, by the number "7" shown in FIGS. 7A through 7C, by the number "6" shown in FIGS. 6A through 6F, by the number "5" shown in FIGS. 5A and 5B, by the number "4" shown in FIGS. 4A and 4B, by the number "3" shown in FIGS. 3A through 3H, by the number "2" shown in FIGS. 2A and 2B or by the number "1" shown in FIGS. 1A through 1D.

As is shown in FIG. 12A, a cavity of a lower frame 1214 has a plurality of components installed therein, including a pair of circuit boards 1260 and a heat sink 1265. For example, as is shown in FIG. 12A, one or more power components 1254 (e.g., power sources such as batteries or fuel cells, or other electrical components such as capacitors, resistors, inductors or transistors) and a network connector 1226 (e.g., a transceiver and/or an Ethernet connection) are mounted to one of the circuit boards 1260. Additionally, one or more processors or other components (not shown) may also be mounted to one of the circuit boards 1260. A pair of standoffs 1243 (or spacers) extend from within the cavity of the lower frame 1214 and above the circuit boards 1260 and the heat sink 1265.

Additionally, as is also shown in FIG. 12A, an upper frame 1212 defining a cavity includes an air flow outlet 1218. The cavity defined by the upper frame 1212 has a substantially square shape or cross-section with respect to a vertical axis. The upper frame 1212 is configured to mate with the lower frame 1214, and has a height that is selected to accommodate the various components within the cavity of the lower frame 1214, including but not limited to the circuit boards 1260, the heat sink 1265, the power source 1254, the network connector 1226 and others when the upper frame 1212 is mated with the lower frame 1214.

As is further shown in FIG. 12A, the upper frame 1212 includes bores or other openings in an upper panel or surface for coupling the upper frame 1212 to the lower frame 1214 by a plurality of fasteners 1245, which may extend through the bores or other openings to mate with the standoffs 1243. The upper frame 1212 further includes a hole or other opening in the upper panel or surface that is sized to accommodate or correspond with the network connector 1226. Additionally, the air flow outlet 1218 is provided in the upper panel or surface of the upper frame 1212.

Although the lower frame 1214 of FIG. 12A is shown as acting as a chassis, and the upper frame 1212 of FIG. 12B is shown as acting as a cover, some implementations of the dual camera module systems of the present disclosure may be constructed such that internal components are mounted to or within a cavity of the upper frame 1212, and that the lower frame 1214 acts as a cover for such components.

As is shown in FIG. 12B, a dual camera module system 1210 of the present disclosure is formed when the upper frame 1212 is joined to the lower frame 1214 by the fasteners 1245.

As is also discussed above, the dual camera module systems of the present disclosure may be constructed to include one or more internal flow paths for accommodating cooling air flow therethrough, in order to maintain the camera modules or other components therein at acceptable temperatures, and to discharge excess heat therefrom during operations. Referring to FIGS. 13A through 13D, views of aspects of one dual camera module system in accordance with implementations of the present disclosure are shown. Except where otherwise noted, reference numerals preceded by the number "13" shown in FIGS. 13A through 13D indicate components or features that are similar to components or features having reference numerals preceded by the number "12" shown in FIGS. 12A and 12B, by the number "11" shown in FIGS. 11A and 11B, by the number "10" shown in FIGS. 10A and 10B, by the number "9" shown in FIGS. 9A and 9B, by the number "8" shown in FIGS. 8A and 8B, by the number "7" shown in FIGS. 7A through 7C, by the number "6" shown in FIGS. 6A through 6F, by the number "5" shown in FIGS. 5A and 5B, by the number "4" shown in FIGS. 4A and 4B, by the number "3" shown in FIGS. 3A through 3H, by the number "2" shown in FIGS. 2A and 2B or by the number "1" shown in FIGS. 1A through 1D.

Figure 13A:
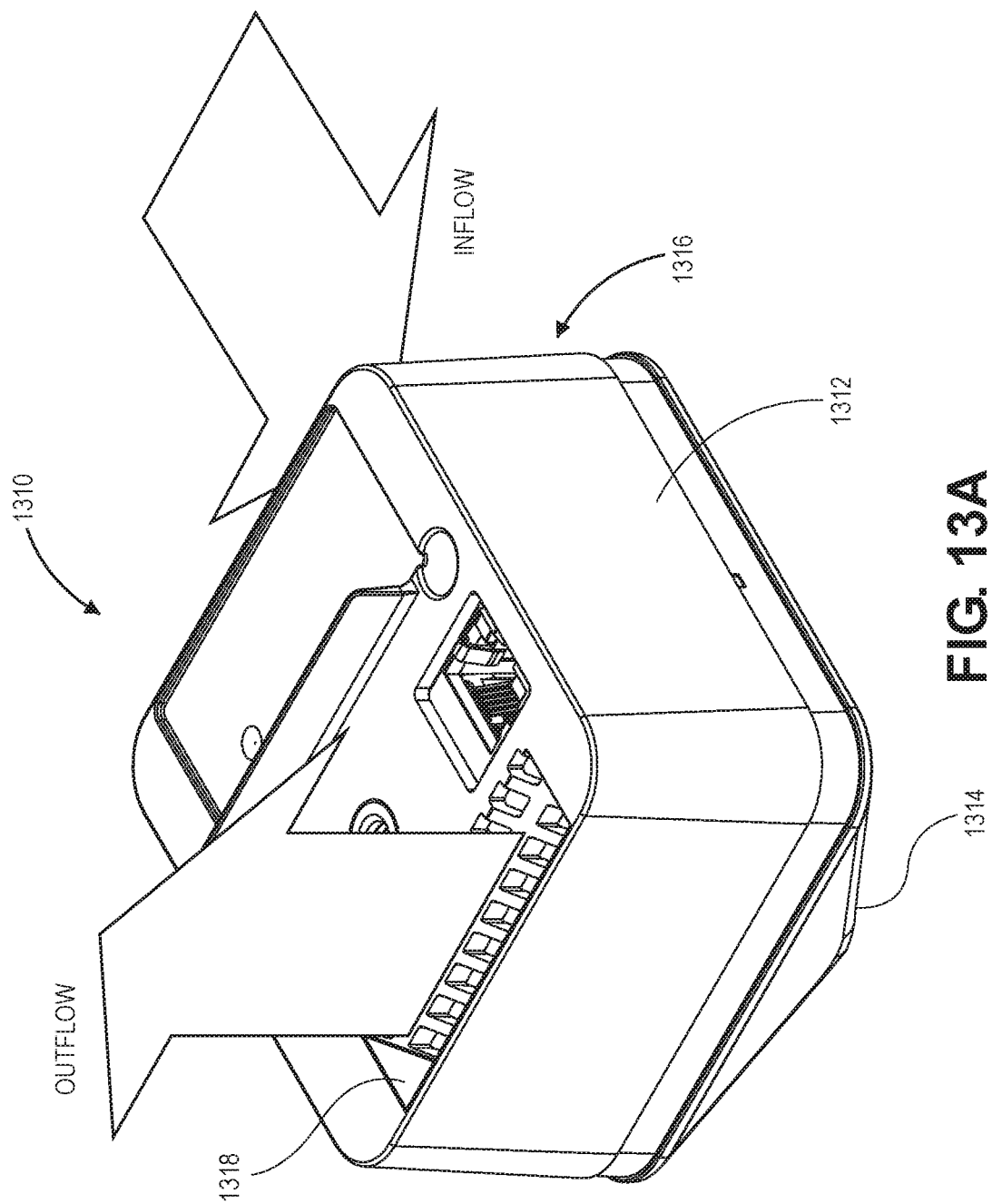
FIGS. 13A through 13D are views of aspects of one dual camera module system in accordance with implementations of the present disclosure.

As is shown in FIG. 13A, a dual camera module system 1310 includes an upper frame 1312 (or upper portion of a housing) and a lower frame 1314 (or lower portion of a housing). The dual camera module system 1310 further includes an airflow inlet 1316 provided in a side panel or surface of the lower frame 1314, e.g., at or near an edge of the lower frame 1314 that mates with the upper frame 1312, and an airflow outlet 1318 provided in a top panel or surface (or upper panel or surface) of the upper frame 1312. The dual camera module system 1310 is thus configured to receive flows of air in a substantially horizontal direction into a cavity defined by the upper frame 1312 and the lower frame 1314 by way of the airflow inlet 1316, and to expel the air from the cavity in a substantially vertical direction, by way of the air flow outlet 1318.

Figure 13B:
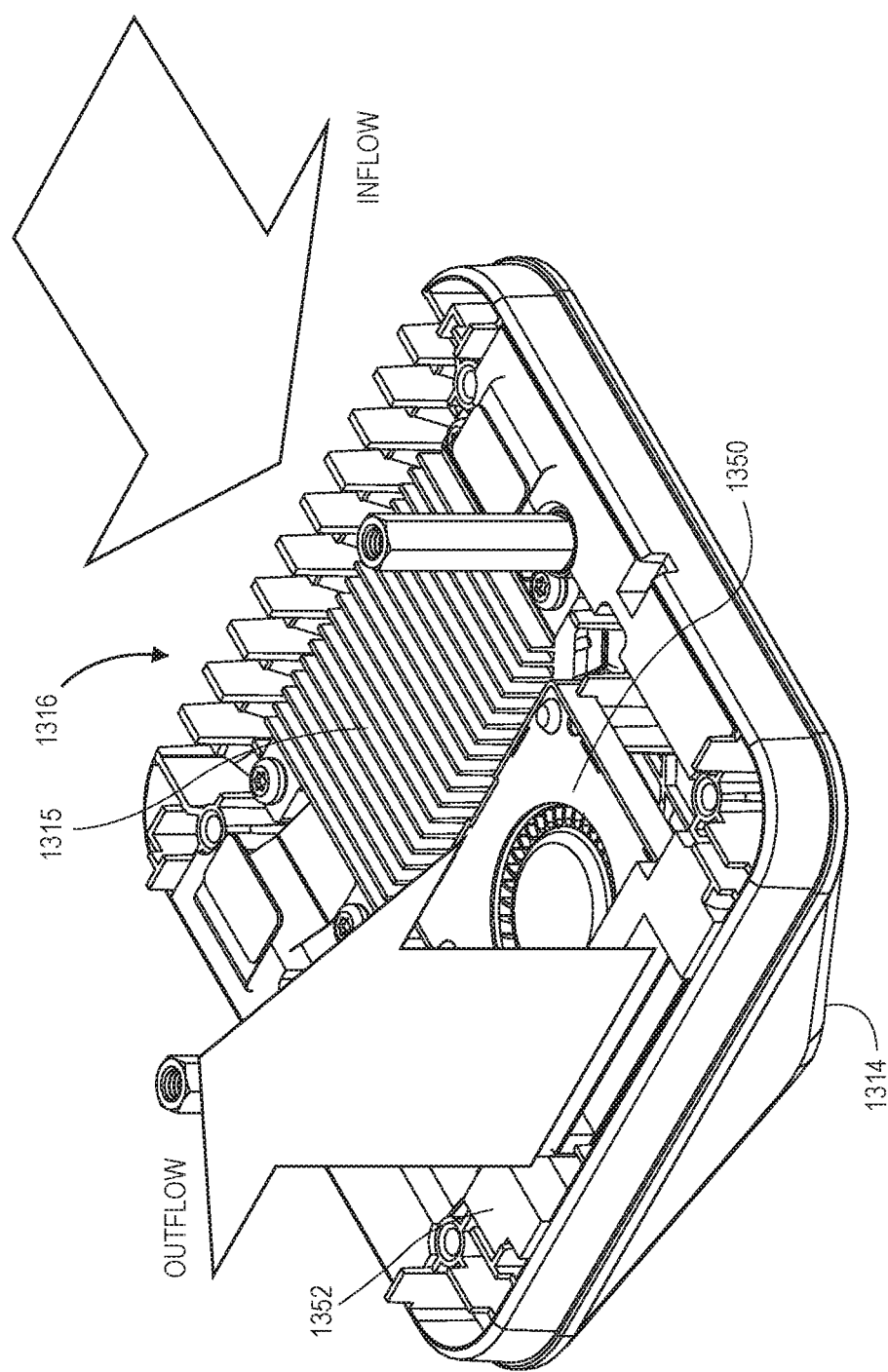

In accordance with implementations of the present disclosure, the dual camera module systems may be constructed to define internal flow paths within the respective housings, and to provide cooling to specific components within such housings. As is shown in FIG. 13B, the lower frame 1314 of the dual camera module system 1310 further includes a camera assembly 1315 having a pair of camera modules (not shown), a blower 1350 (or fan) and at least one gasket 1352 provided along a perimeter of the lower frame 1314. The blower 1350 is laterally aligned to draw air into the dual camera module system 1310 by way of the air flow inlet 1316, and along a plurality of fins provided on interior sides or surfaces of the camera assembly 1315, before expelling the air in a vertical direction through a channel defined by the at least one gasket 1352. Air passing along the fins or through ducts provided between the fins thereby acts to maintain the camera modules (not shown) mounted to the camera assembly 1315 and other components at an acceptable temperature or within an acceptable temperature range.

Figure 13C:
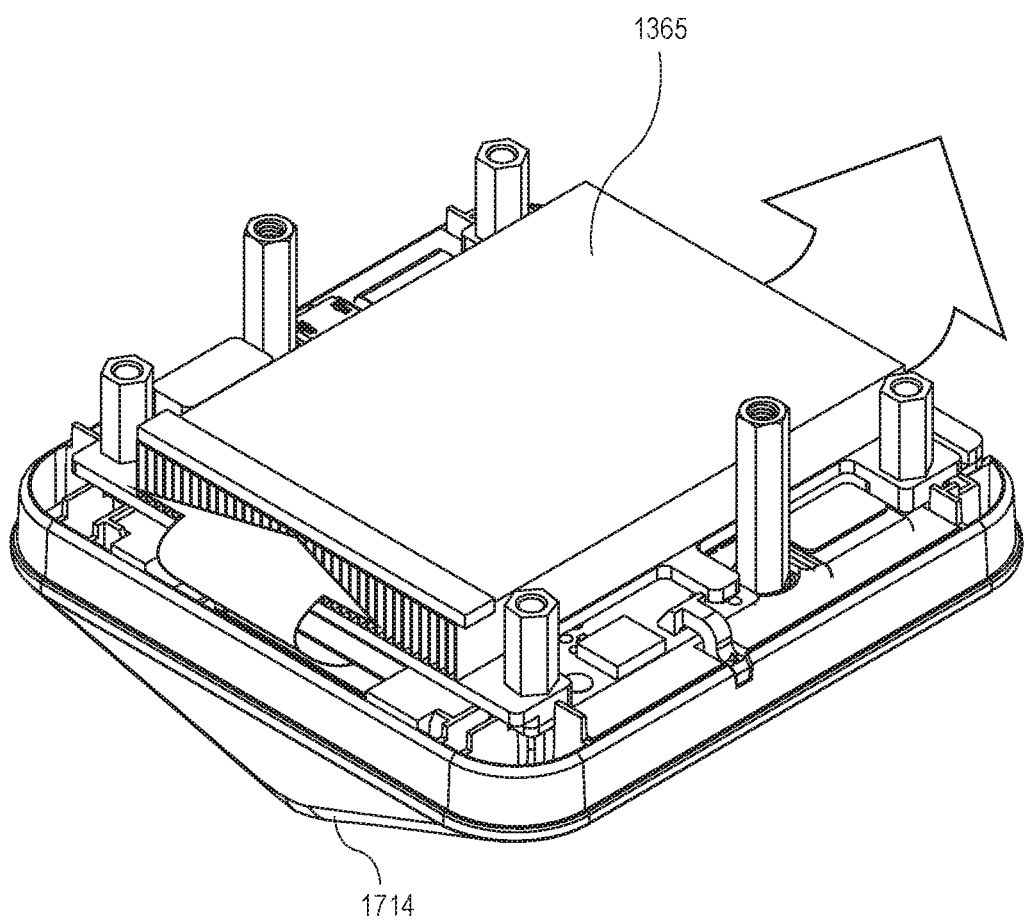

As is shown in FIG. 13C, a heat sink 1365 is installed within the lower frame 1314, above the blower 1350 and the camera assembly 1315 (not shown in FIG. 13C). The heat sink 1365 comprises a pair of planar panels or surfaces aligned in parallel and a plurality of fins extending perpendicular therebetween. Thus, as air flow passes through the channel defined by the at least one gasket 1352, the air is redirected into the heat sink 1365, along the fins and through the ducts before exiting the heat sink 1365 on an opposite side.

Figure 13D:
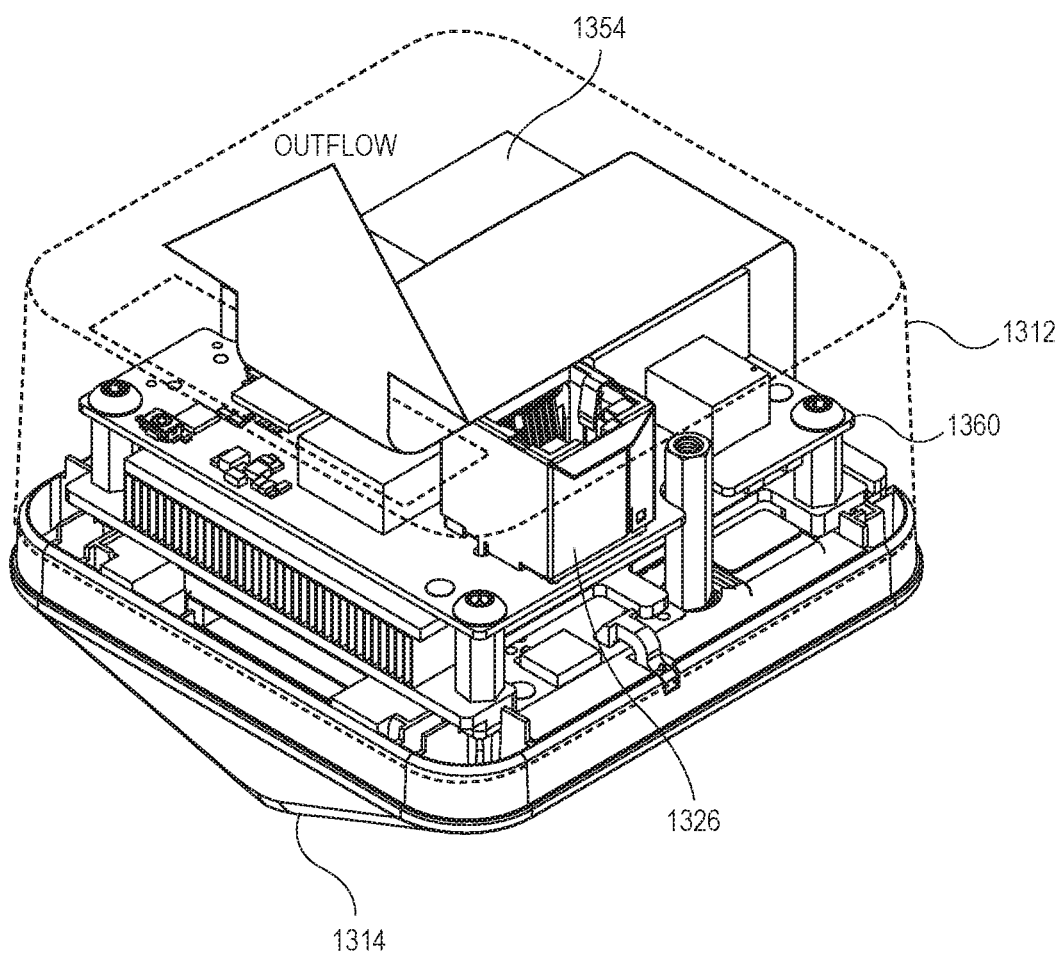

As is shown in FIG. 13D, a circuit board 1360 having a power source 1354 (e.g., a battery) and a network connection 1326 (e.g., an Ethernet connector) is mounted over the heat sink 1365 (not shown in FIG. 13D). After exiting the heat sink 1365, the flow of air is redirected over components mounted to the circuit board 1360, including but not limited to the power source 1354 and/or the network connection 1326, before exiting the dual camera module system 1310 by way of the air flow outlet 1318 shown in FIG. 13A.

Although some of the implementations disclosed herein reference the use of the dual camera module systems of the present disclosure in materials handling facilities or like environments, those of ordinary skill in the pertinent arts will recognize that the systems and methods disclosed herein are not so limited, and may be utilized in connection with cameras that are provided for any intended industrial, commercial, recreational or other use.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, orders in which such methods or processes are presented are not intended to be construed as any limitation on the claimed inventions, and any number of the method or process steps or boxes described herein can be combined in any order and/or in parallel to implement the methods or processes described herein. For example, although some of the drawings depict processes for assembling a dual camera module system by coupling components to one portion of a housing (e.g., a frame) and mating that portion of the housing with another portion of the housing (e.g., another frame), those of ordinary skill in the pertinent arts will recognize that the dual camera module systems disclosed herein may be assembled in any manner. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A dual camera module system comprising:
    a housing having an upper panel, a first side panel, a second side panel, a third side panel, a fourth side panel, a first lower angled panel and a second lower angled panel;
    an airflow inlet provided in the first side panel, wherein the airflow inlet comprises at least a first opening between an exterior of the housing and an interior of the housing;
    an airflow outlet provided in the upper panel, wherein the airflow outlet comprises at least a second opening between the exterior of the housing and the interior of the housing;
    an optical bench comprising a first planar section, a second planar section and a first heat sink, wherein the first planar section and the second planar section form an obtuse dihedral angle, wherein the first heat sink comprises a first plurality of fins mounted to a first side of the first planar section or a first side of the second planar section, wherein the first plurality of fins are aligned in parallel and laterally co-aligned with the airflow inlet, and wherein the optical bench is mounted within the interior of the housing;
    a first digital camera module comprising a first image sensor and a first lens, wherein the first digital camera module is coupled to a second side of the first planar section, and wherein a first field of view defined by the first image sensor and the first lens extends through the first lower angled panel;
    a second digital camera module comprising a second image sensor and a second lens, wherein the second digital camera module is coupled to a second side of the second planar section, and wherein a second field of view defined by the second image sensor and the second lens extends through the second lower angled panel;
    a blower disposed within the interior of the housing, wherein the blower is laterally co-aligned with the first plurality of fins, and wherein the blower is configured to draw air from the exterior of the housing into the interior of the housing by way of the airflow inlet;
    a first circuit board disposed within the interior of the housing, wherein at least a first computer processor is coupled to the first circuit board, and wherein the first circuit board is provided above the optical bench and the blower within the housing;
    a second heat sink disposed within the interior of the housing, wherein the second heat sink comprises a second plurality of fins aligned in parallel, and wherein the second heat sink is provided above the first circuit board; and a second circuit board disposed within the interior of the housing, wherein at least one power component and at least one network connector are coupled to the second circuit board, and wherein the second circuit board is provided above the second heat sink within the housing.

2. The dual camera module system of claim 1, wherein the housing comprises an upper frame and a lower frame, wherein the upper frame defines a first cavity comprising at least the upper panel, the first side panel, the second side panel, the third side panel and the fourth side panel, wherein the lower frame defines a second cavity comprising the first lower angled panel and the second lower angled panel, wherein each of the optical bench and the blower is mounted to the lower frame within the second cavity, and wherein each of the upper frame and the lower frame is formed from polycarbonate.

3. The dual camera module system of claim 1, wherein the upper panel has a length of approximately seventy-five millimeters and a width of approximately seventy-five millimeters.

4. The dual camera module system of claim 1, wherein an internal flow path within the housing extends from the airflow inlet to the airflow outlet via at least:

a first plurality of ducts, wherein each of the first plurality of ducts is between two of the first plurality of fins;

the blower, wherein an inlet of the blower is laterally aligned with at least one of the first plurality of ducts;

a channel between an outlet of the blower and a second plurality of ducts, wherein each of the second plurality of ducts is between two of the second plurality of fins;

the second plurality of ducts; and a space above the second circuit board, and wherein the blower is configured to initiate a flow of air through the housing along the internal flow path.

5. A system comprising:
a housing, wherein the housing comprises:
an upper frame comprising an upper panel and a plurality of side panels; and
a lower frame comprising a first panel and a second panel, wherein the first panel and the second panel form a first dihedral angle,
wherein the upper frame is joined to the lower frame by at least one of a fastener, a spacer or a standoff;
an optical bench disposed within the housing, wherein the optical bench comprises a first planar section, a second planar section and a first heat sink, wherein the first heat sink comprises a first plurality of fins, and wherein each of the first plurality of fins is joined to one of a first side of the first planar section or a first side of the second planar section, wherein the first planar section and the second planar section form a second dihedral angle, and wherein the second dihedral angle is approximately the first dihedral angle;
a first digital camera module disposed within the housing, wherein the first digital camera module comprises a first lens and a first sensor, wherein the first lens defines a first field of view extending normal to a first panel of the housing, and wherein the first sensor is coupled to a second side of the first planar section; and
a second digital camera module disposed within the housing, wherein the second digital camera module comprises a second lens and a second sensor, wherein the second lens defines a second field of view extending normal to a second panel of the housing, and wherein the second sensor is coupled to a second side of the second planar section,
wherein the first field of view of the first digital camera module overlaps the second field of view of the second digital camera module at least in part.

6. The system of claim 5,
wherein the first field of view of the first digital camera module overlaps the second field of view of the second digital camera module at a predetermined distance from the housing.

7. The system of claim 5, wherein the housing comprises:
an inlet comprising at least a first opening between an interior of the housing and an exterior of the housing; and
an outlet comprising at least a second opening between the interior of the housing and the exterior of the housing; and
wherein an internal flow path through the interior of the housing begins at the inlet and ends at the outlet.

8. The system of claim 7, further comprising:
a blower disposed within the interior of the housing,
wherein the blower is configured to initiate a flow of air along the internal flow path.

9. The system of claim 5, wherein the housing has a width of approximately seventy-five millimeters, a length of approximately seventy-five millimeters, and a height of approximately sixty millimeters.

10. The system of claim 5, wherein at least a portion of the housing is formed from a polycarbonate, and
wherein at least a portion of the optical bench is formed from an extruded aluminum alloy.

11. A system comprising:
a housing, wherein the housing comprises an inlet comprising at least a first opening between an interior of the housing and an exterior of the housing and an outlet comprising at least a second opening between the interior of the housing and the exterior of the housing, wherein an internal flow path through the interior of the housing begins at the inlet and ends at the outlet wherein the internal flow path comprises a first plurality of ducts, and wherein each of the first plurality of ducts is between two of the first plurality of fins;
an optical bench disposed within the housing, wherein the optical bench comprises a first planar section, a second planar section and a first heat sink, wherein the first heat sink comprises a first plurality of fins, and wherein each of the first plurality of fins is joined to one of a first side of the first planar section or a first side of the second planar section, and wherein the first planar section and the second planar section form a first dihedral angle;
a first digital camera module disposed within the housing, wherein the first digital camera module comprises a first lens and a first sensor, wherein the first lens defines a first field of view extending normal to a first panel of the housing, and wherein the first sensor is coupled to a second side of the first planar section; and
a second digital camera module disposed within the housing, wherein the second digital camera module comprises a second lens and a second sensor, wherein the second lens defines a second field of view extending normal to a second panel of the housing, and wherein the second sensor is coupled to a second side of the second planar section, wherein the first field of view of the first digital camera module overlaps the second field of view of the second digital camera module at least in part.

12. A system comprising:

a housing, wherein the housing comprises an inlet comprising at least a first opening between an interior of the housing and an exterior of the housing and an outlet comprising at least a second opening between the interior of the housing and the exterior of the housing, wherein an internal flow path through the interior of the housing begins at the inlet and ends at the outlet;

an optical bench disposed within the housing, wherein the optical bench comprises a first planar section, a second planar section and a first heat sink, wherein the first heat sink comprises a first plurality of fins, and wherein each of the first plurality of fins is joined to one of a first side of the first planar section or a first side of the second planar section, and wherein the first planar section and the second planar section form a first dihedral angle;

a second heat sink disposed within the housing, wherein the second heat sink comprises a second plurality of fins aligned in parallel, wherein the internal flow path comprises a second plurality of ducts, and wherein each of the second plurality of ducts is between two of the second plurality of fins;

a first digital camera module disposed within the housing, wherein the first digital camera module comprises a first lens and a first sensor, wherein the first lens defines a first field of view extending normal to a first panel of the housing, and wherein the first sensor is coupled to a second side of the first planar section; and a second digital camera module disposed within the housing, wherein the second digital camera module comprises a second lens and a second sensor, wherein the second lens defines a second field of view extending normal to a second panel of the housing, and wherein the second sensor is coupled to a second side of the second planar section, wherein the first field of view of the first digital camera module overlaps the second field of view of the second digital camera module at least in part.

13. A system comprising:

a housing, wherein the housing comprises an inlet comprising at least a first opening between an interior of the housing and an exterior of the housing and an outlet comprising at least a second opening between the interior of the housing and the exterior of the housing, wherein an internal flow path through the interior of the housing begins at the inlet and ends at the outlet;

an optical bench disposed within the housing, wherein the optical bench comprises a first planar section, a second planar section and a first heat sink, wherein the first heat sink comprises a first plurality of fins, and wherein each of the first plurality of fins is joined to one of a first side of the first planar section or a first side of the second planar section, and wherein the first planar section and the second planar section form a first dihedral angle;

a first circuit board disposed within the housing, wherein the internal flow path comprises at least one space between a first side of the first circuit board and the optical bench within the interior of the housing, and wherein at least a first computer processor is disposed on a second side of the first circuit board;

a first digital camera module disposed within the housing, wherein the first digital camera module comprises a first lens and a first sensor, wherein the first lens defines a first field of view extending normal to a first panel of the housing, and wherein the first sensor is coupled to a second side of the first planar section; and a second digital camera module disposed within the housing, wherein the second digital camera module comprises a second lens and a second sensor, wherein the second lens defines a second field of view extending normal to a second panel of the housing, and wherein the second sensor is coupled to a second side of the second planar section, wherein the first field of view of the first digital camera module overlaps the second field of view of the second digital camera module at least in part.

14. The system of claim 13, further comprising a second circuit board disposed within the housing, wherein a first network connector is mounted to one side of the second circuit board.

15. A system comprising:

a housing;

an optical bench disposed within the housing, wherein the optical bench comprises a first planar section, a second planar section and a first heat sink, wherein the first heat sink comprises a first plurality of fins, and wherein each of the first plurality of fins is joined to one of a first side of the first planar section or a first side of the second planar section, and wherein the first planar section and the second planar section form a first dihedral angle;

a first digital camera module disposed within the housing, wherein the first digital camera module comprises a first lens and a first sensor, wherein the first lens defines a first field of view extending normal to a first panel of the housing, and wherein the first sensor is coupled to a second side of the first planar section; and a second digital camera module disposed within the housing, wherein the second digital camera module comprises a second lens and a second sensor, wherein the second lens defines a second field of view extending normal to a second panel of the housing, and wherein the second sensor is coupled to a second side of the second planar section, wherein the first field of view of the first digital camera module overlaps the second field of view of the second digital camera module at least in part, and wherein at least one of a second heat sink or a circuit board is joined to one of the first panel or the second panel by at least one of a fastener, a spacer or a standoff.

16. The system of claim 15, wherein the housing comprises:

a blower disposed within the interior of the housing, an inlet comprising at least a first opening between an interior of the housing and an exterior of the housing; and an outlet comprising at least a second opening between the interior of the housing and the exterior of the housing, wherein an internal flow path through the interior of the housing begins at the inlet and ends at the outlet, and wherein the blower is configured to initiate a flow of air along the internal flow path.

17. A system comprising:
- a bench comprising a first planar section and a second planar section, wherein the first planar section and the second planar section form a first dihedral angle;
- a heat sink, wherein the heat sink comprises a plurality of fins, wherein each of the plurality of fins is aligned parallel to one another, and wherein each of the plurality of fins is joined to one of a second side of the first planar section or a second side of the second planar section;
- a first digital camera module comprising a first lens and a first sensor, wherein the first digital camera module is coupled to a first side of the first planar section, and wherein a first axis of orientation of the first digital camera module defined by the first lens and the first sensor extends normal to the first side of the first planar section; and
- a second digital camera module comprising a second lens and a second sensor, wherein the second digital camera module is coupled to a first side of the second planar section, and wherein a second axis of orientation of the second digital camera module defined by the second lens and the second sensor extends normal to the first side of the second planar section.

18. The system of claim 17, wherein a first field of view of the first camera module overlaps a second field of view of the second camera module at a predetermined distance from the bench, and
wherein the predetermined distance is between approximately three inches and approximately twelve inches.

19. The system of claim 17, further comprising:
- a housing, wherein the bench, the heat sink, the first digital camera and the second digital camera are disposed within the housing;
- a blower disposed within the interior of the housing,
- an inlet comprising at least a first opening between an interior of the housing and an exterior of the housing; and
- an outlet comprising at least a second opening between the interior of the housing and the exterior of the housing,
- wherein an internal flow path through the interior of the housing begins at the inlet, passes between at least two of the fins, and ends at the outlet, and
- wherein the blower is configured to initiate a flow of air along the internal flow path.

20. The system of claim 19, wherein at least a portion of the housing is formed from a polycarbonate, and
wherein at least a portion of the bench is formed from an extruded aluminum alloy.

* * * * *